(12) United States Patent
Miyajima

(10) Patent No.: US 11,017,454 B2
(45) Date of Patent: May 25, 2021

(54) AGENT ROBOT CONTROL SYSTEM, AGENT ROBOT SYSTEM, AGENT ROBOT CONTROL METHOD, AND STORAGE MEDIUM

(71) Applicant: SONY CORPORATION, Tokyo (JP)

(72) Inventor: Yasushi Miyajima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 151 days.

(21) Appl. No.: 16/314,523

(22) PCT Filed: Apr. 17, 2017

(86) PCT No.: PCT/JP2017/015510
§ 371 (c)(1),
(2) Date: Dec. 31, 2018

(87) PCT Pub. No.: WO2018/012073
PCT Pub. Date: Jan. 18, 2018

(65) Prior Publication Data
US 2019/0164218 A1    May 30, 2019

(30) Foreign Application Priority Data

Jul. 13, 2016  (JP) .............................. JP2016-138933

(51) Int. Cl.
*G06Q 30/06* (2012.01)
*G06Q 10/08* (2012.01)
(Continued)

(52) U.S. Cl.
CPC ......... *G06Q 30/0633* (2013.01); *G06Q 30/06* (2013.01); *G06Q 30/0617* (2013.01);
(Continued)

(58) Field of Classification Search
None
See application file for complete search history.

(56) References Cited

U.S. PATENT DOCUMENTS

| 5,787,233 A * | 7/1998 | Akimoto | G06Q 10/047 |
| | | | 706/45 |
| 8,718,837 B2 * | 5/2014 | Wang | G05D 1/0038 |
| | | | 701/2 |

(Continued)

FOREIGN PATENT DOCUMENTS

| AU | 2012317104 A1 | 3/2014 |
| CN | 103843027 A | 6/2014 |

(Continued)

OTHER PUBLICATIONS

Tsui, K.M., et al., "Towards designing telepresence robot navigation for people with disabilities," International Journal of Intelligent Computing and Cybernetics, vol. 7, No. 3, pp. 307-344. (Year: 2014).*

(Continued)

*Primary Examiner* — Nicholas D Rosen
(74) *Attorney, Agent, or Firm* — Chip Law Group

(57) ABSTRACT

Provided is an agent robot control system comprising an acquisition unit which acquires a purchasing master list which shows a user's purchase merchandise candidates, and a control unit which generates a purchasing execution list for recommending, from the purchasing master list, purchases for select merchandise to be performed at real storefronts and for recommending purchases for other merchandise to be performed at online storefronts.

12 Claims, 26 Drawing Sheets

(51) Int. Cl.
*B25J 13/08* (2006.01)
*B25J 11/00* (2006.01)

(52) U.S. Cl.
CPC ..... *G06Q 30/0619* (2013.01); *G06Q 30/0639* (2013.01); *G06Q 30/0643* (2013.01); *B25J 11/008* (2013.01); *B25J 13/08* (2013.01); *B25J 13/081* (2013.01); *G05B 2219/39* (2013.01); *G05B 2219/40* (2013.01); *G06Q 10/087* (2013.01)

(56) References Cited

U.S. PATENT DOCUMENTS

| | | | | |
|---|---|---|---|---|
| 8,972,291 | B2* | 3/2015 | Rimnac | H04N 5/247 |
| | | | | 705/28 |
| 10,016,897 | B2* | 7/2018 | Hitchcock | G06Q 30/0645 |
| 10,065,321 | B2* | 9/2018 | Miyashita | G06Q 30/06 |
| 10,592,963 | B2* | 3/2020 | Merz | G06F 16/24575 |
| 2008/0015944 | A1 | 1/2008 | Nose et al. | |
| 2010/0082455 | A1* | 4/2010 | Rosenblatt | G06Q 30/0251 |
| | | | | 705/26.1 |
| 2012/0197464 | A1* | 8/2012 | Wang | B25J 9/1689 |
| | | | | 701/2 |
| 2013/0085888 | A1 | 4/2013 | Kim et al. | |
| 2014/0067564 | A1* | 3/2014 | Yuan | G06Q 30/0635 |
| | | | | 705/16 |
| 2014/0279290 | A1* | 9/2014 | Rimnac | G06F 16/58 |
| | | | | 705/28 |
| 2016/0046025 | A1 | 2/2016 | Miyashita et al. | |
| 2016/0364786 | A1* | 12/2016 | Wankhede | G07G 1/14 |
| 2017/0032446 | A1* | 2/2017 | Merz | G06Q 10/087 |
| 2017/0061286 | A1* | 3/2017 | Kumar | G06Q 30/0269 |
| 2017/0072568 | A1* | 3/2017 | Hitchcock | G06Q 30/0645 |
| 2017/0282362 | A1* | 10/2017 | Erhart | B25J 11/008 |

FOREIGN PATENT DOCUMENTS

| | | | |
|---|---|---|---|
| EP | 1850281 | A1 | 10/2007 |
| EP | 2761565 | A1 | 8/2014 |
| EP | 2980746 | A1 | 2/2016 |
| EP | 3355256 | A1 | 8/2018 |
| JP | 2000-296904 | A | 10/2000 |
| JP | 2004-017200 | A | 1/2004 |
| JP | 2006-031570 | A | 2/2006 |
| JP | 2007-299095 | A | 11/2007 |
| JP | 2008-087892 | A | 4/2008 |
| JP | 2010-046742 | A | 3/2010 |
| JP | 4766346 | B2 | 9/2011 |
| JP | 2012-056001 | A | 3/2012 |
| JP | 5145681 | B2 | 2/2013 |
| JP | 2013-061701 | A | 4/2013 |
| JP | 2013-088001 | A | 5/2013 |
| JP | 2013-151045 | A | 8/2013 |
| JP | 2013257793 | A * | 12/2013 |
| JP | 2014-188597 | A | 10/2014 |
| JP | 2014-530407 | A | 11/2014 |
| JP | 6019124 | B2 | 11/2016 |
| JP | 6069607 | B2 | 2/2017 |
| KR | 10-2013-0034745 | A | 4/2013 |
| RU | 2014117159 | A | 11/2015 |
| WO | 2013/047996 | A1 | 4/2013 |
| WO | 2014/156728 | A1 | 10/2014 |

OTHER PUBLICATIONS

Extended European Search Report of EP Application No. 17827207.6, dated Jun. 4, 2019, 09 pages.

International Search Report and Written Opinion of PCT Application No. PCT/JP2017/015510, dated May 16, 2017, 09 pages of ISRWO.

Office Action for EP Patent Application No. 17827207.6, dated Feb. 1, 2021, 10 pages of Office Action.

Office Action for JP Patent Application No. 2018-527401, dated Mar. 16, 2021, with 04 pages of Office Action and 06 pages of English Translation.

* cited by examiner

FIG. 5

| MASTER NUMBER | PRODUCT NAME/ARTICLE | CATEGORY | NUMBER /VOLUME | NECESSARY DELIVERY DATE (d1) |
|---|---|---|---|---|
| 1 | XX MORNING | MILK | 1 | WITHIN TWO DAYS |
| 2 | EGG | CHICKEN EGG | 10 | WITHIN TWO HOURS |
| 3 | B COMPANY SPHYGMOMANOMETER YY | HEALTH APPLIANCE | 1 | WITHIN ONE WEEK |
| 4 | ALKALINE AA CELL BATTERY | BATTERY | 4 | WITHIN THREE DAYS |
| 5 | HAMBURG OF XX | RETORT FOOD | 1 | WITHIN EIGHT HOURS |
| 6 | CABBAGE | VEGETABLE | 1 | WITHIN 24 HOURS |
| 7 | PORK | MEAT | 150(g) | WITHIN TWO HOURS |
| 8 | XX OF CACAO | SWEET STUFF | 5 | WITHIN 24 HOURS |
| 9 | YYYYY | ADHESIVE | 1 | WITHIN 24 HOURS |

| SHOP NAME (ID) | TYPE | URL/API INFORMATION | SHOP HOLIDAY | OPENING HOUR | CLOSING HOUR |
|---|---|---|---|---|---|
| ONLINE SHOP 5A | HOME APPLIANCE MASS MARKET | http://www.aabbcc.co.j | NONE | 0:00 | 0:00 |
| ONLINE SHOP 5B | MULTIPRODUCT MAIL ORDER | http://www.bbccdd.co.j | NONE | 0:00 | 0:00 |
| ONLINE SHOP 5C | SUPERMARKET | http://www.ddeeff.co.j | NONE | 9:00 | 20:00 |

| SHOP NAME (ID) | TYPE | POSITION | SHOP HOLIDAY | OPENING HOUR | CLOSING HOUR |
|---|---|---|---|---|---|
| PHYSICAL SHOP 4A | SUPERMARKET | 35.4639, 139.6171 | NONE | 9:00 | 20:00 |
| PHYSICAL SHOP 4B | CONVENIENCE STORE | 35.4610, 139.6183 | NONE | 0:00 | 0:00 |
| PHYSICAL SHOP 4D | GENERAL STORE | 35.4613, 139.6185 | WEDNESDAY | 9:30 | 18:00 |

ONLINE SHOP 5A

| MASTER NUMBER | PRICE |
|---|---|
| 3 | ¥14870 |
| 4 | ¥167 |

ONLINE SHOP 5B

| MASTER NUMBER | PRICE |
|---|---|
| 3 | ¥15350 |
| 4 | ¥128 |
| 8 | ¥148 |
| 9 | ¥298 |

ONLINE SHOP 5C

| MASTER NUMBER | PRICE |
|---|---|
| 1 | ¥152 |
| 6 | ¥132 |
| 8 | ¥150 |

PHYSICAL SHOP 4A

| MASTER NUMBER | PRICE |
|---|---|
| 1 | ¥158 |
| 2 | ¥240 |
| 4 | ¥185 |
| 6 | ¥124 |
| 7 | ¥187 |

PHYSICAL SHOP 4B

| MASTER NUMBER | PRICE |
|---|---|
| 1 | ¥182 |
| 2 | ¥280 |
| 4 | ¥225 |
| 5 | ¥270 |
| 8 | ¥180 |
| 9 | ¥340 |

PHYSICAL SHOP 4D

| MASTER NUMBER | PRICE |
|---|---|
| 4 | ¥195 |
| 9 | ¥320 |

FIG. 18

| MASTER NUMBER | PURCHASE SHOP (ID) | PURCHASE STATUS |
|---|---|---|
| 1 | PHYSICAL SHOP 4A | |
| 2 | PHYSICAL SHOP 4A | |
| 3 | ONLINE SHOP 5A | |
| 4 | ONLINE SHOP 5B | |
| 5 | PHYSICAL SHOP 4B | |
| 6 | PHYSICAL SHOP 4A | |
| 7 | PHYSICAL SHOP 4A | |
| 8 | ONLINE SHOP 5B | |
| 9 | ONLINE SHOP 5B | |

CURRENT IN-REFRIGERATOR ITEM LIST 271

| PRODUCT NAME/ARTICLE | NUMBER |
|---|---|
| XX MORNING | 0 |
| EGG | 8 |
| BLESSING OF ORANGE OF XX | 1 |
| TOMATO KETCHUP | 0 |
| TOFU | 1 |
| CARROT | 1 |
| SHORTCAKE | 1 |
| ... | ... |

PREVIOUS IN-REFRIGERATOR ITEM LIST 272

| PRODUCT NAME/ARTICLE | NUMBER |
|---|---|
| XX MORNING | 1 |
| EGG | 2 |
| BLESSING OF ORANGE OF XX | 1 |
| TOMATO KETCHUP | 1 |
| TOFU | 0 |
| CARROT | 2 |
| SHORTCAKE | 0 |
| ... | ... |

FIG. 22

PURCHASE CYCLE PROBABILITY LIST ~274

| PRODUCT NAME/ARTICLE | PURCHASE CYCLE PREDICTION | | | | | |
|---|---|---|---|---|---|---|
| | ONE DAY | TWO DAYS | THREE DAYS | ... | ONE WEEK | ONE MONTH OR MORE |
| XX MORNING | 0.13 | 0.58 | 0.22 | | 0.01 | 0.00 |
| EGG | 0.00 | 0.02 | 0.18 | | 0.26 | 0.00 |
| BLESSING OF ORANGE OF XX | 0.00 | 0.00 | 0.00 | | 0.00 | 1.00 |
| TOFU | 0.35 | 0.45 | 0.15 | | 0.02 | 0.00 |
| TOMATO KETCHUP | 0.00 | 0.00 | 0.00 | | 0.00 | 1.00 |
| ... | ... | ... | ... | | ... | ... |

AGENT ROBOT CONTROL SYSTEM, AGENT ROBOT SYSTEM, AGENT ROBOT CONTROL METHOD, AND STORAGE MEDIUM

CROSS REFERENCE TO RELATED APPLICATIONS

This application is a U.S. National Phase of International Patent Application No. PCT/JP2017/015510 filed on Apr. 17, 2017, which claims priority benefit of Japanese Patent Application No. JP 2016-138933 filed in the Japan Patent Office on Jul. 13, 2016. Each of the above-referenced applications is hereby incorporated herein by reference in its entirety.

TECHNICAL FIELD

The present disclosure relates to an agent robot control system, an agent robot system, an agent robot control method, and a storage medium.

BACKGROUND ART

In recent years, the society has been aging, and in daily life, going out for shopping involves a great deal of labor for elderly people. In addition, many of two-job families have difficulties in taking sufficient time for going shopping. In response to such difficulties, nowadays, a delivery service provided from a supermarket and internet shopping have become widespread.

In addition, in recent years, a shopping assist technology that uses a robot has been proposed.

For example, Patent Literature 1 described below discloses a pet robot that carries a baggage. In addition, Patent Literature 2 described below discloses a humanoid robot that guides shops, explains about commercial products, and carries goods. In addition, Patent Literature 3 described below discloses a mascot robot that is attached to a shopping cart in a specific shop, and assists shopping by informing a shopper of report information such as bargain sale. In addition, Patent Literature 4 described below discloses a shopping support system in which, when commercial products are given to robots disposed in a plurality of locations in a shop, the commercial products are conveyed to a checkout counter, and the commercial products can be collectively received before checkout.

CITATION LIST

Patent Literature

Patent Literature 1: JP 2010-046742A
Patent Literature 2: JP 2014-188597A
Patent Literature 3: JP 2013-151045A
Patent Literature 4: JP 2008-87892A

DISCLOSURE OF INVENTION

Technical Problem

Nevertheless, if a user tries to buy a necessary product in a shop offering the lowest price, when the product is necessary, the user needs to manually perform internet search to decide what product is to be bought in which shop, and this involves labors and time. In addition, depending on a commercial product, the commercial product can be sometimes obtained earlier at lower price by purchasing the commercial product in a nearby physical shop, rather than purchasing the commercial product in an internet shop (online shop), but further labors are required for seeking for an optimum way of buying by comprehensively researching these.

In addition, none of Patent Literatures described above mentions recommending optimality as to what commercial product is to be purchased in which of an online shop and a physical shop, among commercial products necessary for the user.

In view of the foregoing, the present disclosure proposes an agent robot control system, an agent robot system, an agent robot control method, and a storage medium that can support optimum shopping in a physical shop and an online shop.

Solution to Problem

According to the present disclosure, there is proposed an agent robot control system including: an acquisition section configured to acquire a purchase master list indicating a candidate of a purchase commercial product of a user; and a control section configured to generate a purchase execution list for recommending purchase in a physical shop for a partial commercial product of the purchase master list, and recommending purchase in an online shop for another commercial product.

According to the present disclosure, there is proposed an agent robot system including: a server including a first communication section configured to acquire a purchase master list indicating a candidate of a purchase commercial product of a user, and a first control section configured to generate a purchase execution list for recommending purchase in a physical shop for a partial commercial product of the purchase master list, and recommending purchase in an online shop for another commercial product, and perform control so as to transmit the purchase execution list to an agent robot via the first communication section; and an agent robot including a second communication section configured to receive the purchase execution list, an output section configured to output information to a user, and a control section configured to control the output section to output, to the user, information recommending purchase in a physical shop for the partial commercial product, and recommending purchase in an online shop for the other commercial product, on the basis of the purchase execution list.

According to the present disclosure, there is proposed an agent robot control method including: by a processor, acquiring a purchase master list indicating a candidate of a purchase commercial product of a user; and generating a purchase execution list for recommending purchase in a physical shop for a partial commercial product of the purchase master list, and recommending purchase in an online shop for another commercial product.

According to the present disclosure, there is proposed a storage medium having an agent robot control program stored thereon, the agent robot control program causing a computer to function as: an acquisition section configured to acquire a purchase master list indicating a candidate of a purchase commercial product of a user; and a control section configured to generate a purchase execution list for recommending purchase in a physical shop for a partial commercial product of the purchase master list, and recommending purchase in an online shop for another commercial product.

Advantageous Effects of Invention

As described above, according to the present disclosure, it becomes possible to support optimum shopping in a physical shop and an online shop.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a diagram illustrating an example of a purchase master list according to the present embodiment.

FIG. 6 is a diagram illustrating an example of an online shop list according to the present embodiment.

FIG. 7 is a diagram illustrating an example of a physical shop list according to the present embodiment.

FIG. 12 is a diagram illustrating an example of an online shop item list according to the first embodiment of the present disclosure.

FIG. 15 is a diagram illustrating an example of a physical shop item list according to the first embodiment of the present disclosure.

FIG. 18 is a diagram illustrating an example of a purchase execution list according to the first embodiment of the present disclosure.

FIG. 20 is a diagram illustrating an example of a current in-refrigerator item list and a previous in-refrigerator item list according to the second embodiment of the present disclosure.

FIG. 22 is a diagram illustrating an example of a purchase cycle probability list according to the second embodiment of the present disclosure.

MODE(S) FOR CARRYING OUT THE INVENTION

Figure 1:
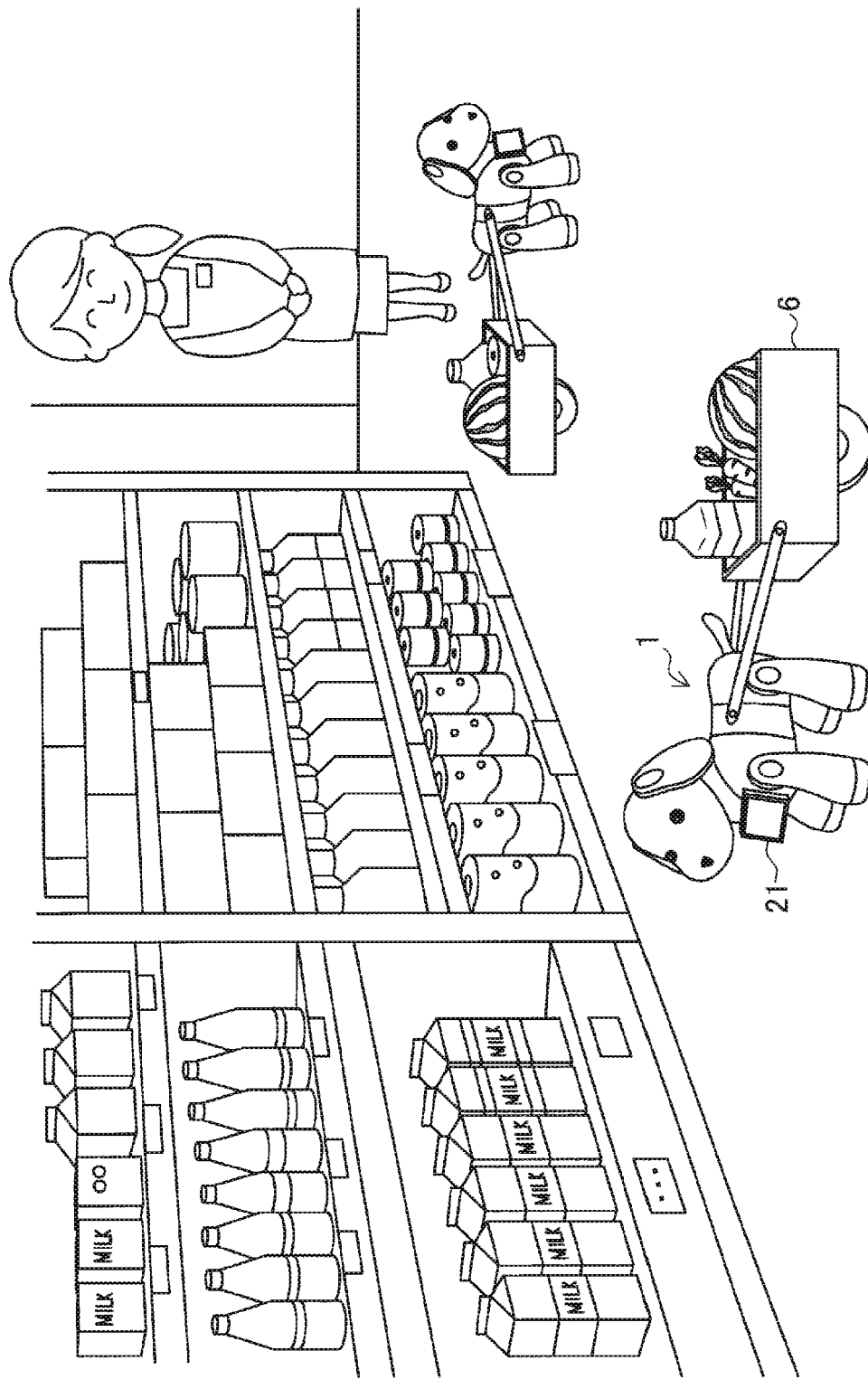
FIG. 1 is a diagram describing an overview of an information processing system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, the description will be given in the following order.

1. Overview of Information Processing System According to Embodiment of Present Disclosure
2. Configuration
2-1. Overall Configuration
2-2. Configuration of Pet Robot 1
3. Operation Processing
3-1. First Embodiment
3-2. Second Embodiment
3-3. Third Embodiment
3-4. Fourth Embodiment
4. Supplement
5. Conclusion 1. OVERVIEW OF INFORMATION PROCESSING SYSTEM ACCORDING TO EMBODIMENT OF PRESENT DISCLOSURE First of all, an overview of an information processing system according to an embodiment of the present disclosure will be described. FIG. 1 is a diagram describing an overview of an information processing system according to the present embodiment. As illustrated in FIG. 1, the information processing system according to the present embodiment is implemented by a pet robot 1 (information processing device) having an entertainment property that is formed to have an external shape imitating an animal such as a dog. The pet robot 1 is an example of an agent that can express animal-like gesture by causing eyes, legs, and the like to autonomously operate.

As described above, if a user tries to buy a necessary product in a shop offering the lowest price, when the product is necessary, the user needs to manually perform internet search to decide what product is to be bought in which shop, and this involves labors and time. Users having computer literacy may not suffer so much, but for elderly people and users who have not computer literacy, this can be a difficult and stressful work. In addition, depending on a commercial product, the commercial product can be sometimes obtained earlier at lower price by purchasing the commercial product in a nearby physical shop, rather than purchasing the commercial product in an internet shop (online shop), but further labors are required for seeking for an optimum way of buying by comprehensively researching these.

In view of the foregoing, in the present disclosure, optimum shopping in a physical shop and an online shop can be supported. In the coming aging society and two-job society, it is very useful to provide assistance in such a manner that, in daily life, a product demanded by a user can be purchased at a lower price at an optimum timing.

Specifically, on the basis of a predetermined purchase list, for example, the information processing system according to the present disclosure recommends an optimum purchase shop (e.g. a shop where a commercial product can be purchased at the lowest price) in view of the prices of each commercial product in an online shop and a physical shop, and dates (delivery dates) on which each commercial product is delivered to the user from an online shop and a physical shop. In addition, on the basis of daily behavior of the user, the information processing system according to the present disclosure can also learn what product is to be purchased at which timing, and recommend a product to be purchased (perform automatic generation of a purchase list), at a time point at which the learning has progressed.

In addition, if the learning further progresses and accuracy increases, on the basis of an automatically-generated purchase list, a robot can also automatically purchase a product at an optimum shop (purchase a product by connecting to an online shop, and purchase a product by autonomously moving to a physical shop). For example, in the case of the pet robot 1 that is autonomously movable as illustrated in FIG. 1, it is possible to move to a physical shop to purchase a commercial product, and carry the commercial product to a home of the user. In the example illustrated in FIG. 1, the pet robot 1 having a dog shape or the like can carry a commercial product to the home of the user by drawing a trolley 6 and asking shop staff to put the commercial product into the trolley 6, for example. Note that the shape of the pet robot 1 is not limited to this, and for example, the pet robot 1 may be of a walking type, a wheel type, or a drone type that enables autonomous movement. In the case of a bipedal walking humanoid agent robot, an operation of seizing a commercial product and putting the commercial product into a shopping cart by using an arm and fingers of an upper half of the body is also enabled.

Aside from voice, interaction with shop staff and the user can be performed by a display section 21 (e.g. touch panel display) provided on the pet robot 1.

Note that the pet robot 1 according to the present embodiment is not limited to a robot that can perform autonomous movement, and may have a shape of a small animal such as a bird, and may be of a shoulder-perching type or a hand-perching type. In this case, it is impossible to autonomously move to a physical shop, but it is possible to support shopping by navigating the user to a physical shop by voice or the like. In addition, it is possible to automatically perform purchase processing in an online shop by connecting to the internet.

An overview of the information processing system according to the present embodiment has been described above. Note that, in the present embodiment, the pet robot 1 is used an example of an information processing device, but the present embodiment is not limited to this, and for example, a virtual substance displayed on a display terminal such as a tablet terminal or a smartphone, that is to say, a tiny robot created by a software program may be used.

Subsequently, an overall configuration of the information processing system according to the present embodiment and a configuration of the pet robot 1 will be specifically described with reference to FIGS. 2 to 8.

2. CONFIGURATION

2-1. Overall Configuration

Figure 2:
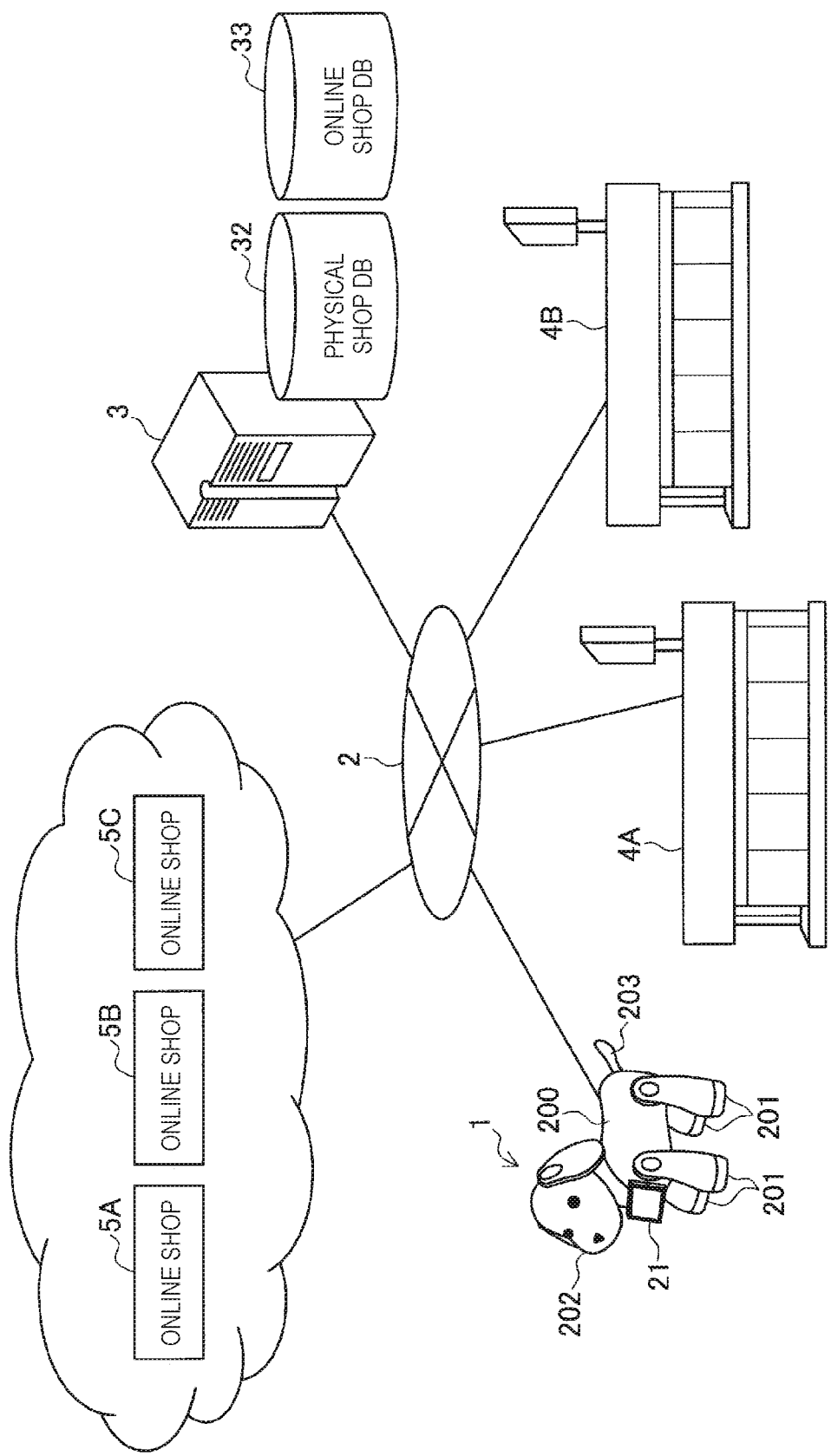
FIG. 2 is a diagram illustrating an example of an overall configuration of the information processing system according to an embodiment of the present disclosure.

FIG. 2 is a diagram illustrating an example of an overall configuration of the information processing system according to the present embodiment. As illustrated in FIG. 2, the information processing system according to the present embodiment includes the pet robot 1 and a server 3. The pet robot 1 and the server 3 are connected via a network 2, and can perform transmission and reception of data.

The server 3 includes a physical shop database (DB) 32 and an online shop DB 33. In the physical shop DB 32 and the online shop DB 33, pieces of shop information (shop name, classification of the type of shop, access information, operating hours, etc.) of online shops 5 (5A to 5C, and so on) and physical shops 4 (4A, 4B, and so on) are stored. The server 3 can construct the databases by collecting pieces of shop information in advance from the online shops 5 and the physical shops 4 connected via the network 2, for example.

2-2. Configuration of Pet Robot 1

Figure 3:
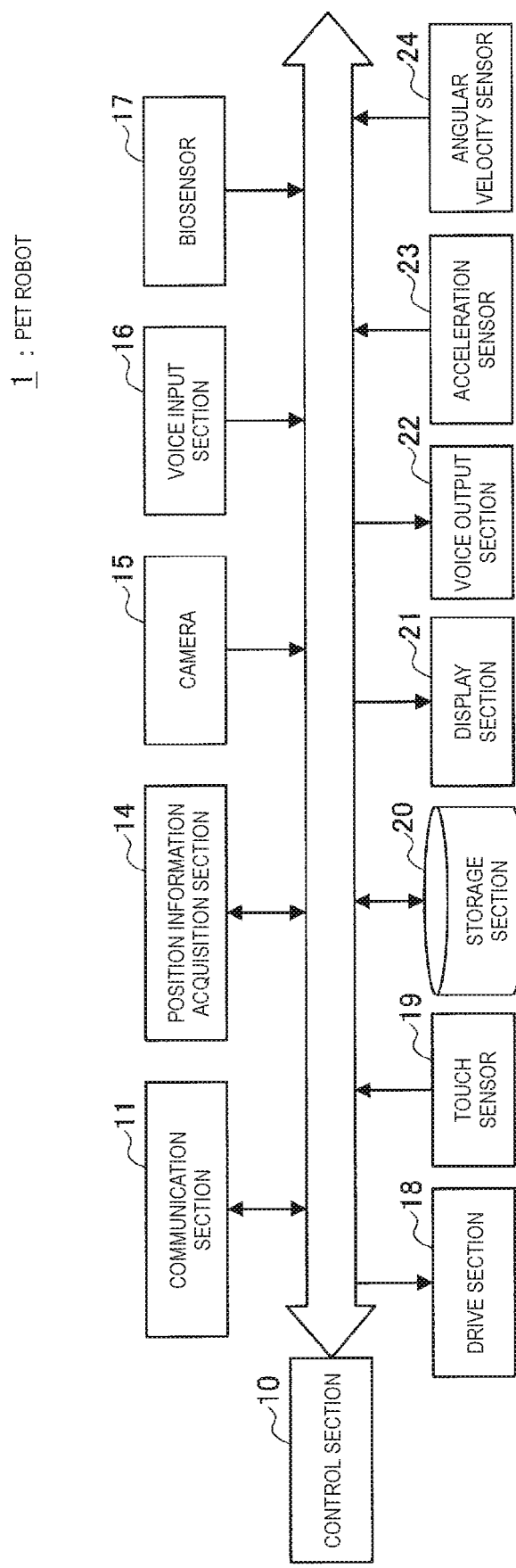
FIG. 3 is a block diagram illustrating an example of a configuration of a pet robot according to an embodiment of the present disclosure.

Subsequently, a configuration of the pet robot 1 according to the present embodiment will be described with reference to FIG. 3. FIG. 3 is a block diagram illustrating an example of a configuration of the pet robot 1 according to the present embodiment. As illustrated in FIG. 3, the pet robot 1 includes a control section 10, a communication section 11, a position information acquisition section 14, a camera 15, a voice input section 16, a biosensor 17, a drive section 18, a touch sensor 19, a storage section 20, the display section 21, a voice output section 22, an acceleration sensor 23, and an angular velocity sensor 24.

The control section 10 functions as an arithmetic processing unit and a control device, and controls the entire operations performed inside the pet robot 1, in accordance with various types of programs. The control section 10 is implemented by an electronic circuit such as a Central Processing Unit (CPU) or a microprocessor, for example. In addition, the control section 10 may include a Read Only Memory (ROM) that stores programs, calculation parameters, and the like that are to be used, and a Random Access Memory (RAM) that temporarily stores appropriately varying parameters and the like.

In addition, the control section 10 according to the present embodiment can perform autonomous control of automatically operating in accordance with various types of information obtained from the communication section 11, the position information acquisition section 14, the camera 15, the voice input section 16, the biosensor 17, the touch sensor 19, the acceleration sensor 23, the angular velocity sensor 24, or the like.

The communication section 11 is a communication module for performing transmission and reception of data with another device. For example, the communication section 11 performs transmission and reception of data by connecting with various types of servers via the network 2, and performs transmission and reception of data by directly connecting with a peripheral device (not illustrated) using Bluetooth (registered trademark) or Wi-Fi (registered trademark).

The position information acquisition section 14 has a function of detecting a current position of the pet robot 1 on the basis of an acquired signal from the outside. Specifically, for example, the position information acquisition section 14 is implemented by a Global Positioning System (GPS) positioning section, detects a position where the pet robot 1 exists, by receiving radio waves from GPS satellites, and outputs the detected position information to the control section 10. The position information may be accumulated in the storage section 20 as a position log of the pet robot 1. In addition, aside from the GPS, the position information acquisition section 14 may be configured to detect a position by Wi-Fi, Bluetooth, or transmission and reception with a mobile phone, a PHS, a smartphone, or the like, near field communication, or the like, for example.

The camera 15 includes a lens system including an imaging lens, a diaphragm, a zoom lens, a focus lens, and the like, a drive system that causes the lens system to perform a focus operation and a zoom operation, a solid-state image sensor array that photoelectrically converts imaging light obtained by the lens system, to generate an imaging signal, and the like. The solid-state image sensor array may be implemented by a Charge Coupled Device (CCD) sensor array or a Complementary Metal Oxide Semiconductor (CMOS) sensor array, for example.

The voice input section 16 collects voice of the user and surrounding environmental sound, and outputs a voice signal to the control section 10. The voice input section 16 is implemented by a microphone, a microphone amplifier section that performs amplification processing of a voice signal obtained by the microphone, and an A/D converter that converts the voice signal into digital, and outputs the voice signal to the control section 10.

The biosensor 17 detects biological information of the user that has touched the pet robot 1. The biological information of the user is, for example, body temperature, an amount of perspiration, beats, a fingerprint, a palm print, blood pressure, brain waves, and the like.

The drive section 18 is a functional module for implementing a degree of freedom at each joint of the pet robot 1, and includes a plurality of drive units provided for respective axes such as roll, pitch, and yaw in each joint. Each drive unit is formed by a combination of a motor that performs a rotational operation around a predetermined axis, an encoder that detects a rotational position of the motor, and a driver that adaptively controls a rotational position and a rotational speed of the motor on the basis of an output of the encoder.

The touch sensor 19 detects pressure received from the user by a physical approach such as "stroking" and "striking". Note that, in place of or in addition to the touch sensor 19, the pet robot 1 may include a pressure sensor.

The storage section 20 stores programs and the like for the control section 10 executing various types of processing. In addition, the storage section 20 includes a storage device including a storage medium, a recording device that records data into the storage medium, a reading device that reads out data from the storage medium, a deletion device that deletes data recorded in the storage medium, and the like.

The display section 21 displays various types of screens such as a manipulation screen and a menu screen. In addition, the display section 21 according to the present embodiment displays a purchase list, a recommended commercial product, a guide of an optimum shop, and the like. The display section 21 may be a display device such as a Liquid Crystal Display (LCD) or an organic Electroluminescence (EL) display, for example.

The voice output section 22 is implemented by a speaker and an amplifier circuit for the speaker. In addition, the voice output section 22 outputs voice such as chirp sound.

The acceleration sensor 23 and the angular velocity sensor 24 detect orientation of the pet robot 1 and acceleration of a motion.

The configuration of the pet robot 1 according to the present embodiment has been specifically described above. Note that the configuration of the pet robot 1 according to the present embodiment is not limited to the example illustrated in FIG. 2, and for example, the pet robot 1 may include other sensors such as a geomagnetic sensor, an ultrasonic sensor, a proximity sensor, an illumination sensor, a temperature sensor, and a barometric sensor. In addition, as a distance sensor for measuring a distance to an object positioned in front, the pet robot 1 may use the camera 15 described above, or additionally include a distance sensor that uses a method such as infrared light.

In addition, as illustrated in FIG. 2, for example, the pet robot 1 may include a body portion unit 200, leg portion units 201 respectively coupled to the anterior left and right and posterior left and right of the body portion unit 200, and a head portion unit 202 and a tail portion unit 203 that are respectively coupled to an anterior end portion and a posterior end portion of the body portion unit 200. In the body portion unit 200, the control section 10 formed by connecting a Central Processing Unit (CPU), a Dynamic Random Access Memory (DRAM), a flash Read Only Memory (ROM), a Personal Computer (PC) card interface circuit, and a signal processing circuit to each other via an internal bus, and a battery serving as a power source of the pet robot 1 are stored. In addition, in the body portion unit 200, the communication section 11, the position information acquisition section 14, the biosensor 17, the storage section 20, the acceleration sensor 23, the angular velocity sensor 24, and the like are also stored. In addition, the display section 21 is installed on a breast portion of the body portion unit 200. An installation location of the display section 21 is not limited to this, and for example, may be a back portion of the body portion unit 200, a forehead portion of the head portion unit 202, or the like.

In addition, in the head portion unit 202, the camera 15 for capturing an image of an external situation, the touch sensor 19 for detecting pressure received from the user by a physical approach such as "stroking" and "striking", the voice input section 16 for collecting external sound, the voice output section 22 for outputting voice such as chirp sound, a distance sensor (not illustrated) for measuring a distance to an object positioned in front, and the like are respectively disposed at predetermined positions. The camera 15 may be provided at a position corresponding to an "eye" of the pet robot 1. In addition, the camera 15 may be disposed in a forehead portion of the head portion unit 202, and a Light Emitting Diode (LED) (not illustrated) may be disposed at a position corresponding to an "eye". In addition, the voice input section 16 may be disposed at a position corresponding to an "ear" of the head portion unit 202, and the voice output section 22 may be disposed at a position corresponding to a "mouth" of the head portion unit 202.

Furthermore, actuators and potentiometers are provided in numbers corresponding to the number of degrees of freedom, at joint portions of the respective leg portion units 201, coupling portions of the respective leg portion units 201 and the body portion unit 200, a coupling portion of the head portion unit 202 and the body portion unit 200, and the like. For example, an actuator includes a servomotor as a configuration. By the driving of the servomotor, the leg portion units 201 are controlled to transition to a target attitude or operation.

Regarding a specific configuration example of the pet robot 1 described above, for example, JP 2002-157596A is referred to. The entire contents of JP 2002-157596A are hereby incorporated by reference.

In addition, the configuration of the pet robot 1 described with reference to FIG. 3 can also be applied to a case where the pet robot 1 is a tiny robot. Specifically, a display terminal that displays a tiny robot includes configurations corresponding to the control section 10, the communication section 11, the position information acquisition section 14, the camera 15, the voice input section 16, the biosensor 17, the touch sensor 19, the storage section 20, the display section 21, and the voice output section 22 that have been described above. The tiny robot is displayed in a display section, and can perform interaction with the user.

(Functional Configuration)

Figure 4:
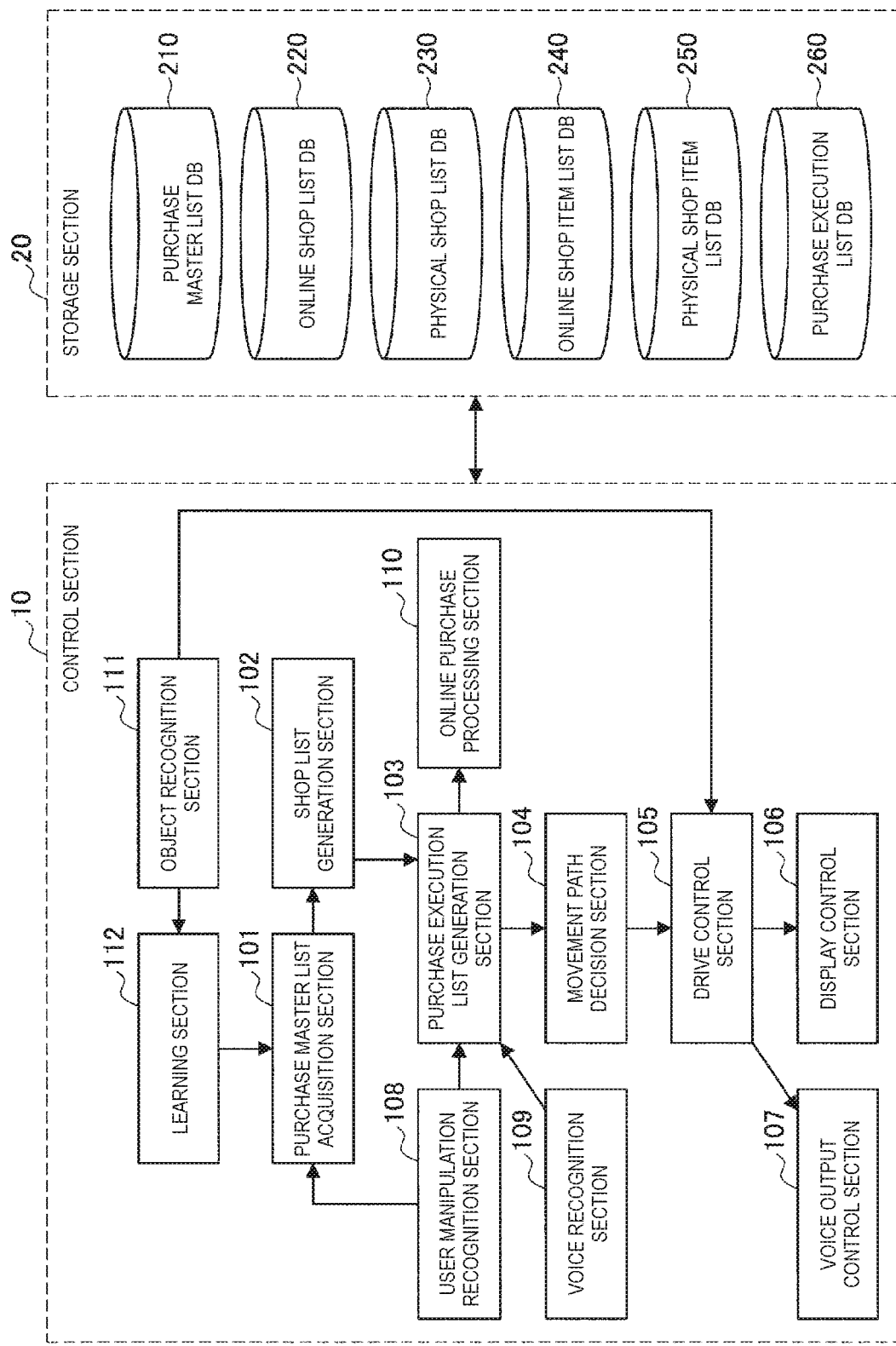
FIG. 4 is a block diagram illustrating functional configuration examples of a control section and a storage section according to an embodiment of the present disclosure.

Subsequently, functional configurations of the control section 10 and the storage section 20 will be described with reference to FIG. 4. FIG. 4 is a block diagram illustrating functional configuration examples of the control section 10 and the storage section 20 according to an embodiment of the present disclosure. In the drawing, as functions of the control section 10 of the pet robot 1, a purchase master list acquisition section 101, a shop list generation section 102, a purchase execution list generation section 103, a movement path decision section 104, a drive control section 105, a display control section 106, a voice output control section 107, a user manipulation recognition section 108, a voice recognition section 109, an online purchase processing section 110, an object recognition section 111, and a learning section 112 are illustrated. In addition, as functions of the storage section 20 of the pet robot 1, a purchase master list DB 210, an online shop list DB 220, a physical shop list DB 230, an online shop item list DB 240, a physical shop item list DB 250, and a purchase execution list DB 260 are illustrated. Hereinafter, each constituent element will be further described.

The purchase master list acquisition section 101 acquires a purchase master list indicating purchase candidate items (commercial products), and stores the purchase master list into the purchase master list DB 210. The purchase master list may be arbitrarily input by the user from a creation screen of a purchase master list, may be automatically generated by the purchase master list acquisition section 101, or may be received via the communication section 11. As an input performed by the user, a voice input (recognized by the voice recognition section 109), a manipulation input performed via a touch panel display (recognized by the user manipulation recognition section 108), an input performed by another communication terminal and received by the communication section 11, or the like is assumed. In addition, the purchase master list acquisition section 101 can also generate a purchase master list on the basis of a learning result of the learning section 112. In addition, the purchase master list acquisition section 101 outputs the acquired purchase master list to the purchase execution list generation section 103.

Here, FIG. 5 illustrates an example of a purchase master list. As illustrated in the drawing, a purchase master list 211 includes data such as a master number, a product name or an article, a category, the number or volume, and a required delivery date d1. The "master number" is a serial number (master number) allocated to an item to be purchased, and corresponds to a master number in each piece of data to be described later. In addition, the "product name or article" is a commercial product name or an article of an item. The "category" is not an essential item, but is input in a case where it is difficult to identify an item only by a product name or an article, or there are the same product names in different categories. The "number or volume" is a required number or volume of an item. The "required delivery date d1" is information regarding a delivery date on which a corresponding item is to be delivered to the user. Based on the information, determination can be performed as to whether an item is urgently required by the user, whether delivery may be after several days, or the like.

On the basis of the purchase master list, the shop list generation section 102 performs search as to at which price and on which delivery date each item can be purchased in each online shop or each physical shop, and generates an online shop item list and a physical shop item list. The generation of each item list will be described later with reference to FIGS. 11 to 15. In addition, the generated item lists may be respectively stored in the online shop item list DB 240 and the physical shop item list DB 250.

Note that a shop list is used in the generation of an item list. The shop list may be prestored in the online shop list DB 220 or the physical shop list DB 230, or may be generated on the basis of information acquired in each case from the physical shop DB 32 and the online shop DB 33 of the server 3 on a network.

Here, data included in the respective shop lists will be described with reference to FIGS. 6 and 7. FIG. 6 is a diagram illustrating an example of an online shop list according to the present embodiment. As illustrated in the drawing, an online shop list 221 includes data such as a shop name (ID), classification of the type of shop, URL or access information, shop holiday, opening hour, and closing hour. The "shop name (ID)" is an online shop name or a unique ID for identifying a corresponding shop. The "type" is not an essential item, but if information that enables estimation of a commercial product category handled by a shop, such as a food shop, a supermarket, a home appliance store, and a general store is input, item search efficiency in the generation of a purchase execution list to be described later can be enhanced. The "URL or access information" is a URL indicating an access destination address or information regarding an API that is for performing item search, acquisition of latest information, and the like, by accessing a corresponding online shop. Note that, in the case of a service requiring the use of a dedicated API for performing search, an API access key, an authentication code, and the like are included in the access information. The "shop holiday" is input in a case where an online shop has a shop holiday. In the "opening hour" and the "closing hour", operating hours of an online shop are input. Normally, in the case of an online shop, purchase processing is assumed to be received throughout 24 hours, but in the case of a service in which a shop directly performs delivery, as in an internet supermarket, an order reception time of the current day is determined in some cases for the sake of delivery time. Thus, such time information is also included.

Figure 8:
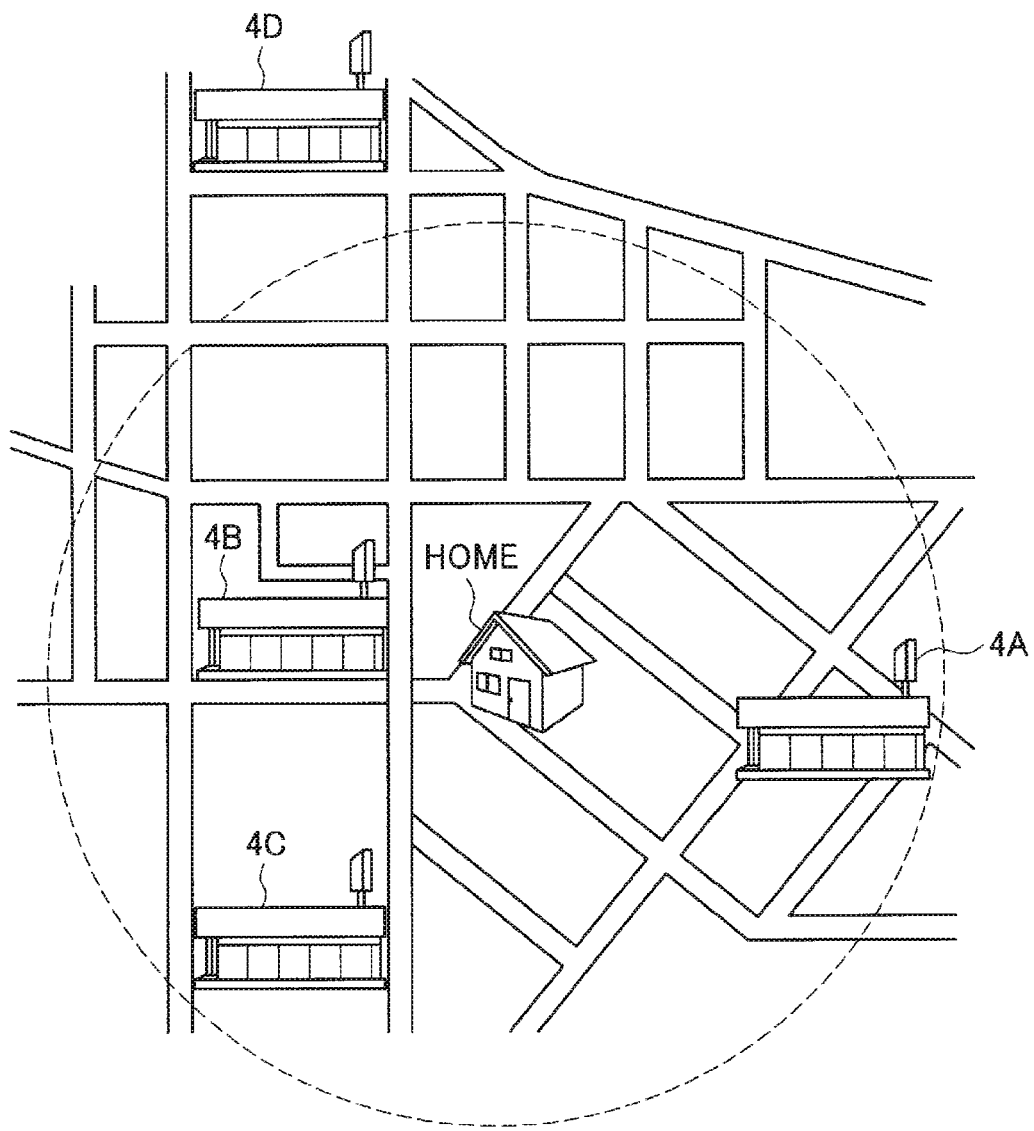
FIG. 8 is a diagram describing a positional relationship between a physical shop and a home according to the present embodiment.

FIG. 7 is a diagram illustrating an example of a physical shop list 231 according to the present embodiment. As illustrated in the drawing, the physical shop list 231 includes data such as a shop name (ID), classification of the type of shop, a position, shop holiday, opening hour, and closing hour. The "shop name (ID)", the "type", the "shop holiday", the "opening hour", and the "closing hour" are items similar to those in the online shop list illustrated in FIG. 6. Thus, the description will be omitted here. The "position" is position information such as latitude and longitude of a corresponding physical shop. Note that, because the user or the pet robot 1 needs to actually move to physical shops included in the physical shop list 231, for item purchase, for example, as illustrated in FIG. 8, a list of physical shops including physical shops 4A, 4B, and 4C that are located within a constant distance from a home of the user, among physical shops 4A to 4D, is used (e.g. sorting of a physical shop list may be performed by the shop list generation section 102 by inputting position information of the home, or the user may select shops). Note that limitation on physical shops is not limited to a distance from the home, and for example, physical shops near a nearest station of a work place, physical shops near a road frequently used by the user in commuting or the like, and the like may be included.

On the basis of a physical shop item list and an online shop item list, the purchase execution list generation section 103 generates a purchase execution list indicating a physical shop or an online shop that is optimum for the purchase of each item. The details of purchase execution list generation will be described later with reference to FIGS. 16 to 18. The purchase execution list may be edited in accordance with a user manipulation. For example, in the generated purchase execution list, an item of which purchase has been input by a user manipulation is shifted to a "purchase completion" state. In addition, the generated purchase execution list is stored into the purchase execution list DB 260. In the purchase execution list DB 260, a past history of a purchase execution list is stored together with time and date information.

The movement path decision section 104 decides a movement order of physical shops registered in the purchase execution list. For example, on the basis of current position information of the pet robot 1, and pieces of position information of all the physical shops included in the purchase execution list, the movement path decision section 104 decides, as a movement path, a route in which all the physical shops can be visited with the shortest distance. In addition, a determination algorithm of a movement path is not specifically limited. For example, an existing algorithm such as a solution of a traveling salesman problem may be used. In addition, in accordance with content of a commercial product to be purchased in each shop, the movement path decision section 104 may modify a movement path so as to purchase heavy goods later, for example.

The drive control section 105 controls a movement of the pet robot 1 so as to visit physical shops in accordance with the movement path. Specifically, for example, the drive control section 105 recognizes current position information of the pet robot 1 using the position information acquisition section 14, and controls the drive section 18 to cause the pet robot 1 to autonomously move to a target location. In addition, the drive control section 105 also controls a movement to an exhibition location of a target commercial product in a physical shop, and a movement to a checkout counter. In a shop, for example, movement control is performed by recognizing a surrounding situation in accordance with a result recognized by the object recognition section 111 on the basis of a captured image obtained by capturing an image of a periphery of the pet robot 1 by the camera 15.

The display control section 106 performs information display control with respect to the display section 21. For example, in a case where the pet robot 1 arrives at a target physical shop, the display control section 106 displays a commercial product to be purchased in the shop, on the display section 21, and presents the commercial product to the user or a shop staff. In addition, the display control section 106 displays a screen for presenting, to the user, a purchase item list, a recommended commercial product that is based on a learning result, and in addition, a movement path, and the like.

The voice output control section 107 controls a voice output from the voice output section 22. For example, in a case where the pet robot 1 does not include the display section 21, when the pet robot 1 arrives at a target physical shop, the voice output control section 107 outputs, by voice, the description about a commercial product to be purchased in the shop. In addition, the voice output control section 107 may notify, by voice, the user of a purchase item list, a recommended commercial product that is based on a learning result, and in addition, a movement path, and the like.

The user manipulation recognition section 108 recognizes a manipulation input from the user. For example, a user manipulation input from a touch panel display in which the touch sensor 19 is integrated with the display section 21 is recognized.

The voice recognition section 109 recognizes a voice input from the user. For example, user speech voice collected by the voice input section 16 such as a microphone is analyzed, and speech content is recognized.

The online purchase processing section 110 accesses an online shop registered in the purchase execution list, and performs purchase processing of a corresponding item.

The object recognition section 111 analyzes a captured image captured by the camera 15, and performs object recognition of the periphery of the pet robot 1. An algorithm of the object recognition is not specifically limited, and an existing algorithm may be used. A recognition result is output to the learning section 112 and the drive control section 105.

The learning section 112 learns an item necessary for the user, and a timing (delivery date) of item purchase. A learning result is output to the purchase master list acquisition section 101. The details of the learning processing according to the present embodiment will be described later with reference to FIGS. 19 to 23.

The functional configurations of the control section 10 and the storage section 20 according to the present embodiment have been specifically described above. Subsequently, operation processing of the information processing system according to the present embodiment will be described with reference to FIGS. 9 to 25.

3. OPERATION PROCESSING

3-1. First Embodiment

First of all, operation processing of purchase shop recommendation according to the first embodiment will be described with reference to FIGS. 9 to 18.

Figure 9:
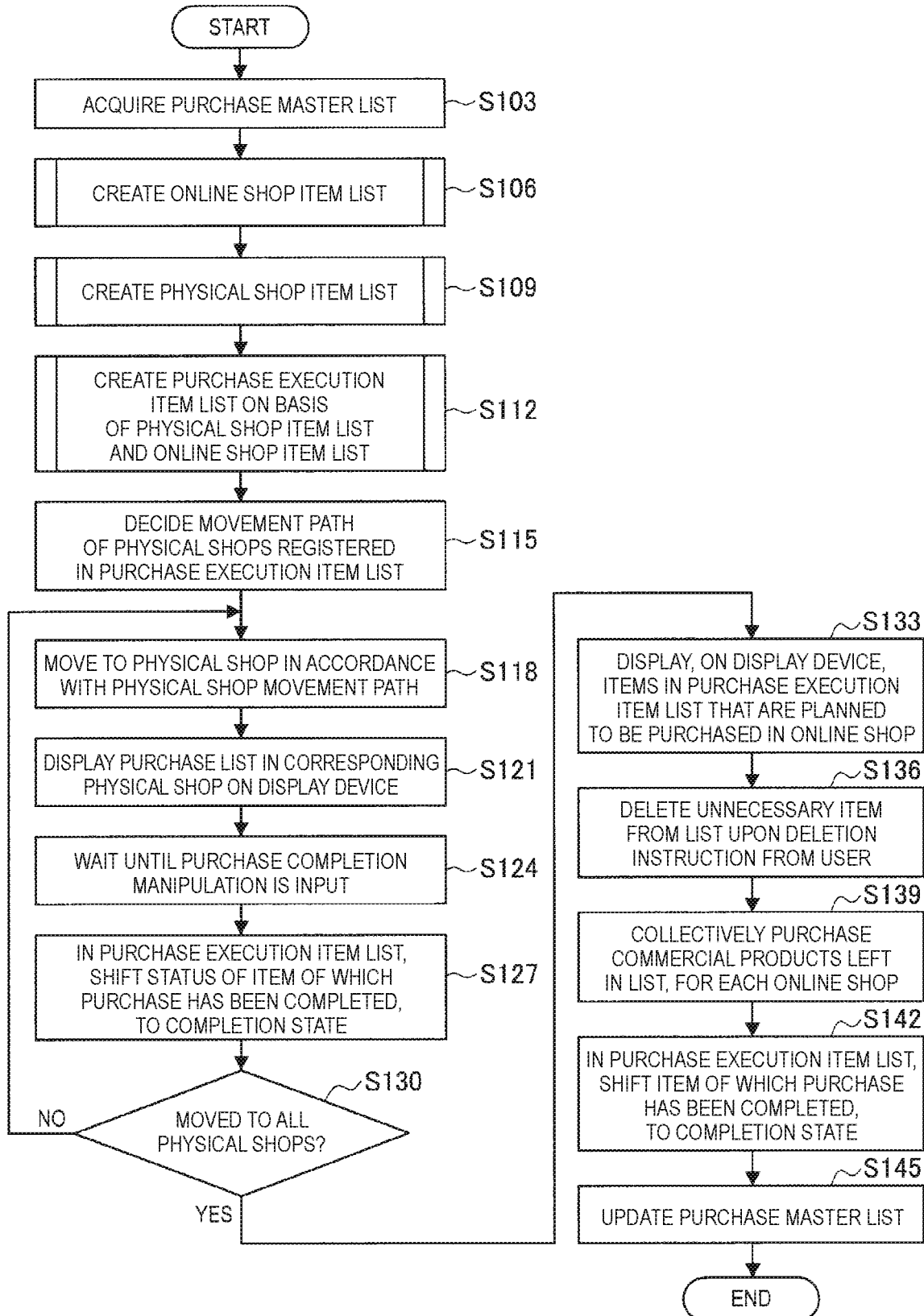
FIG. 9 is a flow chart illustrating operation processing of purchase shop recommendation according to a first embodiment of the present disclosure.

FIG. 9 is a flow chart illustrating operation processing of purchase shop recommendation according to the first embodiment of the present disclosure. As illustrated in FIG. 9, first of all, the control section 10 of the pet robot 1 acquires, using the purchase master list acquisition section 101, a purchase master list being a list of items to be purchased by the user (step S103). Here, for example, a purchase master list is arbitrarily input by the user from a creation screen of a purchase master list that is displayed on the display section 21. Alternatively, a purchase master list is input by the user by voice.

Next, on the basis of the purchase master list, the shop list generation section 102 searches for items in online shops, and generates an online shop item list that summarizes which item can be purchased at what price in each shop (step S106). The details will be described later with reference to FIGS. 11 and 12.

Subsequently, on the basis of the purchase master list, the shop list generation section 102 searches for items in physical shops, and generates a physical shop item list that summarizes which item can be purchased at what price in each shop (step S109). The details will be described later with reference to FIGS. 13 to 15.

Next, on the basis of the physical shop item list and the online shop item list, the purchase execution list generation section 103 generates a purchase execution list that decides which commercial product is to be finally purchased in which shop (step S112). The details of the purchase execution list generation will be described later with reference to FIGS. 16 to 18. The generated purchase execution list is stored into the purchase execution list DB 260 together with time and date information, for example.

Subsequently, the movement path decision section 104 decides a movement path of physical shops registered in the purchase execution list (step S115).

Next, on the basis of the decided movement path, the drive control section 105 moves the pet robot 1 to a physical shop (step S118). At this time, the display control section 106 and the voice output control section 107 may navigate the user to the physical shop.

Subsequently, when the pet robot 1 arrives at a target physical shop, the display control section 106 displays, on the display section 21, an item to be purchased in the shop (purchase list) (step S121). In a case where the pet robot 1 does not include the display section 21, the description of a purchase item is performed by voice by the voice output control section 107. In a case where the pet robot 1 is accompanied by the user, purchase of an item is performed by the user. Alternatively, the pet robot 1 performs purchase of an item by presenting a purchase list to a shop staff of the shop. In a case where the pet robot 1 is provided with a carrying device of items (the trolley 6 illustrated in FIG. 1, etc.), a purchased item is stored into the carrying device.

Figure 10:
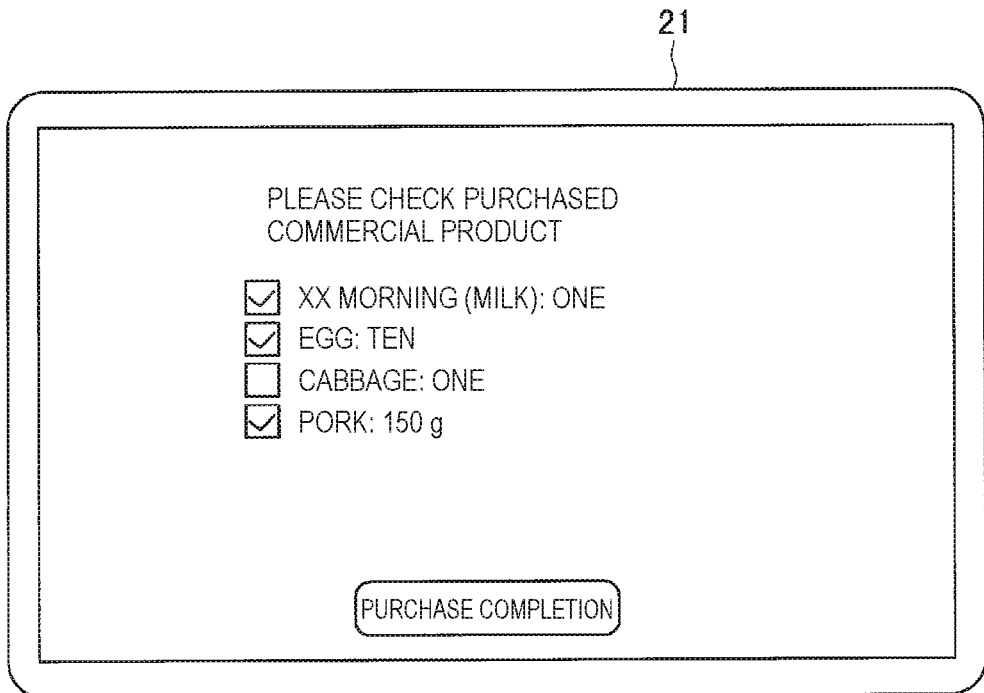
FIG. 10 is a diagram illustrating an example of a purchase completion manipulation screen according to the first embodiment of the present disclosure.

Next, when the purchase is completed, a purchase completion manipulation is input by the user or a shop staff (step S124). The purchase completion manipulation is recognized by the user manipulation recognition section 108. Here, FIG. 10 illustrates an example of a purchase completion manipulation screen. In the drawing, a list of items to be purchased in a physical shop where the pet robot 1 currently exists, check boxes, and a purchase completion button are displayed on the display section 21. The user checks a check box of a purchased item, and taps the purchase completion button. Note that the purchase completion manipulation is not limited to the example illustrated in FIG. 10, and for example, the pet robot 1 may read a sales receipt obtained at the time of purchase, using the camera 15, and recognize purchase completion of an item by Optical Character Reader (OCR).

Subsequently, in the purchase execution list, the purchase execution list generation section 103 shifts a status of an item of which the purchase has been completed, to the "purchase completion" state (step S127). A specific example of a purchase execution list will be described later with reference to FIG. 18. The purchase execution list includes a purchase shop and a purchase status (status) of each item. As illustrated in FIG. 18, at the time of purchase execution list generation, the fields of "purchase status" are all blank, and for example, when a purchase completion manipulation is performed by the user, the "purchase completion" state is registered.

Steps S118 to S127 described above are repeated until the pet robot 1 moves to all the physical shops registered in the purchase execution list (step S130). Note that the control section 10 searches for an optimum shop again for a target item that has not been purchased in a physical shop, and has a status being left blank in the purchase execution list (at this time, excluding the physical shop where the item has not been purchased), and in a case where an optimum physical shop is found, updates the purchase execution list, and controls the pet robot 1 so as to move in accordance with a movement path incorporating the physical shop.

Subsequently, the control section 10 of the pet robot 1 displays, on the display section 21, items in the purchase execution list that are planned to be purchased in an online shop, and presents the items to the user (step S133). Note that the pet robot 1 may speak, by voice, the items planned to be purchased. At this time, the purchase execution list generation section 103 may switch the purchase of an item of which purchase has not been completed in a physical shop, to purchase in an optimum online shop. In addition, the control section 10 searches for an optimum shop again for a target item that has not been purchased in a physical shop, and has a status being left blank in the purchase execution list (at this time, excluding the physical shop where the item has not been purchased), and in a case where an optimum online shop is found, updates the purchase execution list, and presents the item as well, to the user as an item planned to be purchased in an online shop.

Subsequently, in a case where a deletion instruction for a presented purchase execution list is issued from the user by a manipulation input or a voice input, the purchase execution list generation section 103 deletes an instructed item from the purchase execution list (step S136).

Next, the online purchase processing section 110 performs processing of collectively purchasing items left in the purchase execution list, for each online shop (step S139).

Subsequently, in the purchase execution list, the purchase execution list generation section 103 shifts a status of an item of which purchase has been completed, to the "purchase completion" state (step S142).

Then, the control section 10 of the pet robot 1 updates the purchase master list in accordance with a change in status of the purchase execution list (step S145). For example, the control section 10 deletes an item of which purchase has been completed, from the purchase master list.

As described above, the pet robot 1 according to the present embodiment uses, as a purchase master list, a list of items input by the user, and decides an optimum purchase shop of each item. In the case of a physical shop, the pet robot 1 guides the user to the physical shop, and presents an item to be purchased. In addition, in the case of an online shop, the pet robot 1 performs purchase processing by automatically accessing a corresponding online shop.

In this manner, it is possible to support purchase of an item desired by the user, in an optimum shop, and convenience of the pet robot 1 in daily life is further enhanced.

(Generation of Online Shop Item List)

Subsequently, the generation of an online shop item list that is performed by the shop list generation section 102 in step S106 described above will be specifically described with reference to FIG. 11.

Figure 11:
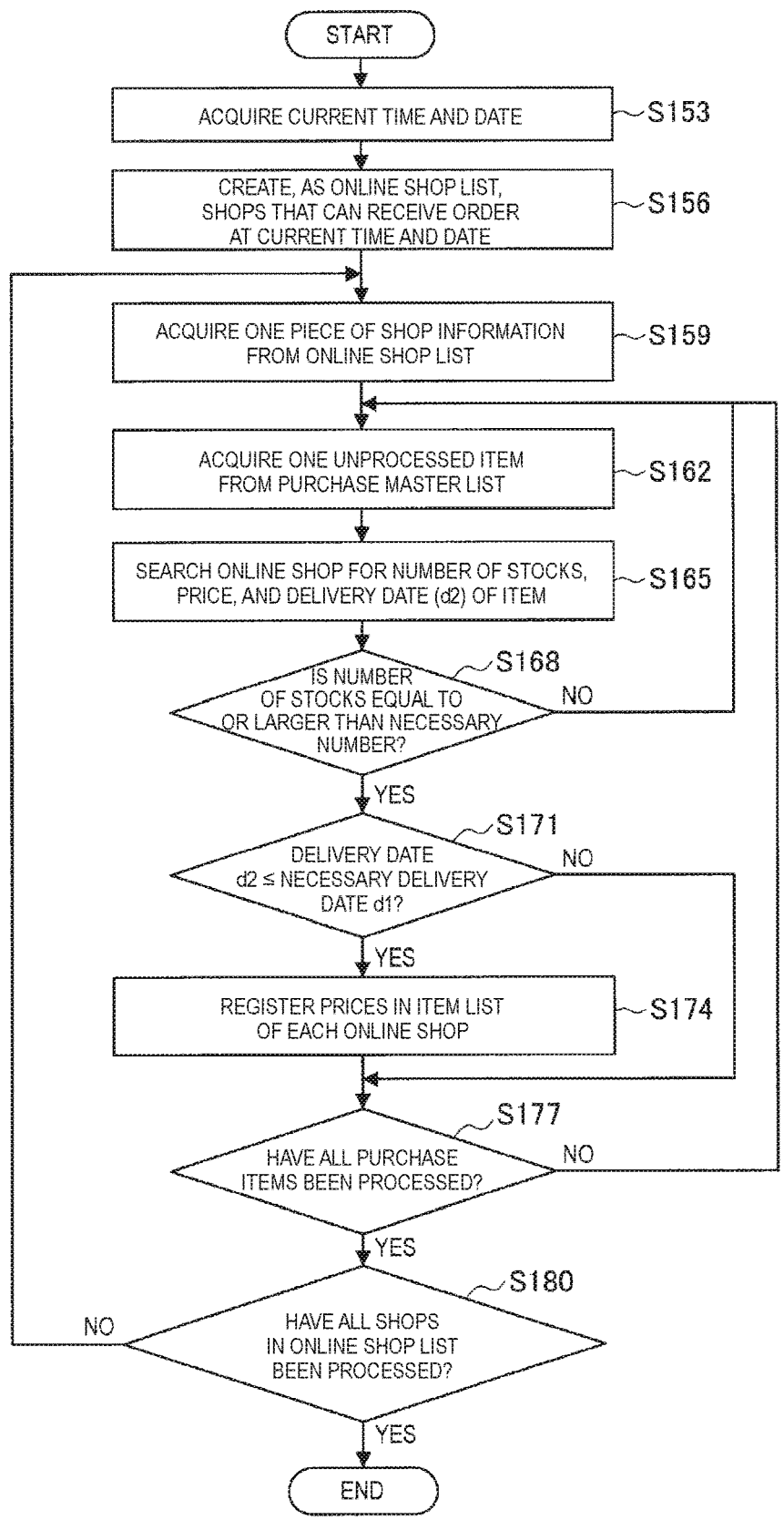
FIG. 11 is a flow chart illustrating generation processing of an online shop item list according to the first embodiment of the present disclosure.

FIG. 11 is a flow chart illustrating generation processing of an online shop item list according to the present embodiment. As illustrated in FIG. 11, first of all, the shop list generation section 102 acquires current time and date (step S153), and generates, as an online shop list, shops that can receive an order at the current time and date (step S156).

Next, the shop list generation section 102 acquires one piece of shop information from the online shop list (step S159), and in addition, acquires one unprocessed item from the purchase master list (step S162).

Subsequently, the shop list generation section 102 acquires information regarding the number of stocks, a price, and a delivery date (d2) in an online shop of the acquired item (step S165). The shop list generation section 102 accesses a Website of a corresponding online shop on the basis of a URL included in the shop information, for example, and searches for the number of stocks of a target item.

Subsequently, it is checked whether or not the number of stocks is equal to or larger than the necessary number (step S168). In a case where the number of stocks is insufficient (step S168/No), the shop list generation section 102 returns to step S162, and searches the online shop for the next item.

On the other hand, in a case where the number of stocks is sufficient (step S168/Yes), the shop list generation section 102 determines whether or not a delivery date satisfies time requirement (step S171). Specifically, the shop list generation section 102 determines whether or not the delivery date d2 is earlier than the delivery date d1 on which an item is required.

Next, in a case where the delivery date satisfies time requirement (step S171/Yes), the shop list generation section 102 registers prices in an item list of each online shop (step S174).

Subsequently, steps S162 to S171 described above are repeated until all the items (purchase items) included in the purchase master list are processed (step S174).

Then, until all the purchase items are processed in all the online shops included in the online shop list, steps S159 to S174 described above are repeated (step S177). Note that, considering the type of an online shop, the shop list generation section 102 can also preferentially process an item estimated to be sold in the online shop, to enhance efficient.

In this manner, an online shop item list is generated. Here, FIG. 12 illustrates an example of an online shop item list. An online shop item list 241 illustrated in FIG. 12 includes price information of each purchase item of each online shop. An item for which the number of stocks is insufficient and an item for which a delivery date is too late are not registered in the online shop item list. As illustrated in FIG. 12, it can be seen that the price of the same item (same master number) varies depending on the shop.

(Generation of Physical Shop Item List)

Next, the generation of a physical shop item list that is performed by the shop list generation section 102 in step S109 described above will be specifically described with reference to FIG. 13.

Figure 13:
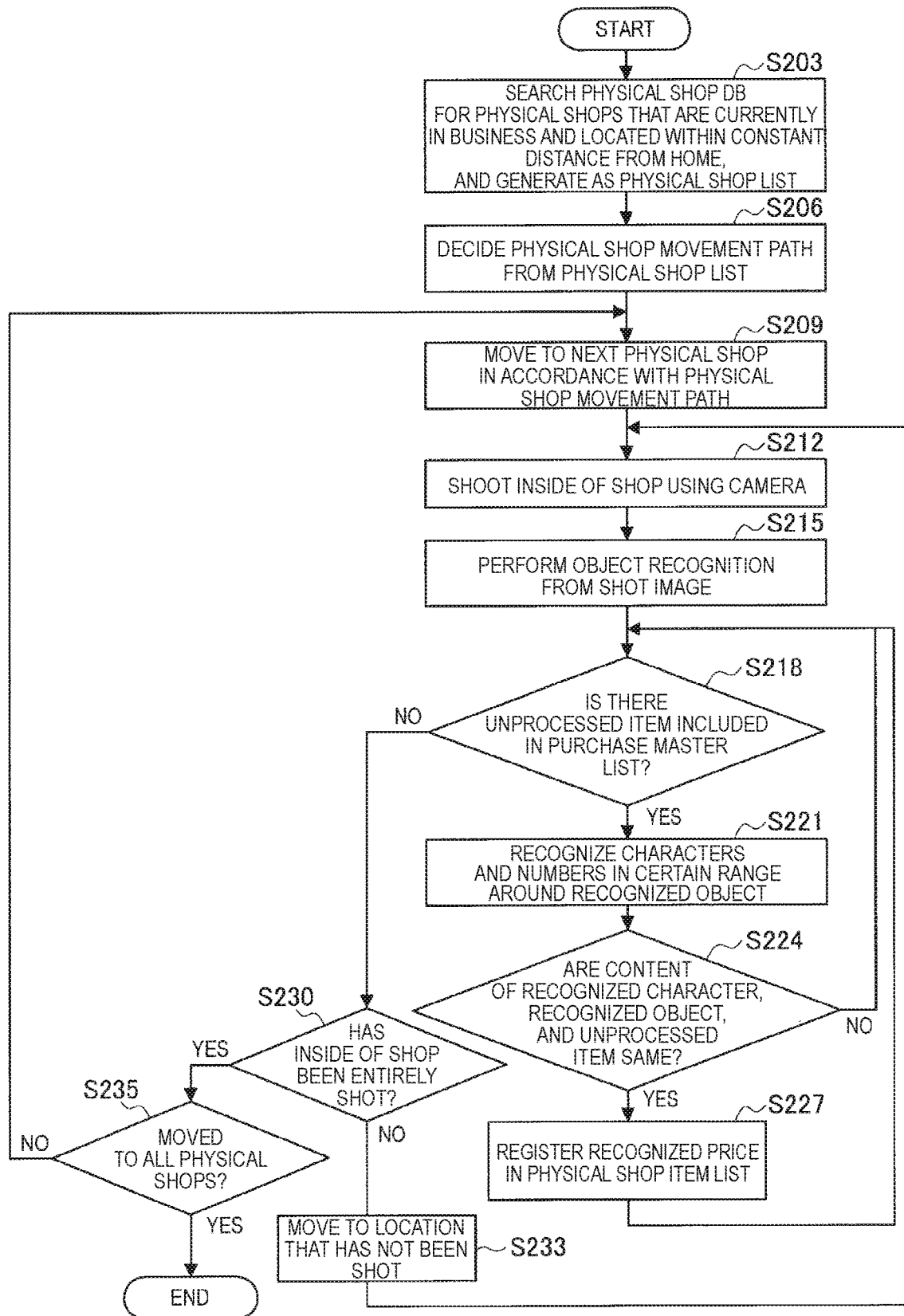
FIG. 13 is a flow chart illustrating generation processing of a physical shop item list according to the first embodiment of the present disclosure.

FIG. 13 is a flow chart illustrating generation processing of a physical shop item list according to the present embodiment. As illustrated in FIG. 13, first of all, the shop list generation section 102 searches the physical shop DB 32 for information regarding physical shops that are currently in business and located within a constant distance from the home, and generates the information as a physical shop list (step S203). Considering a travel time to a physical shop, the shop list generation section 102 may search for physical shops that are to be in business at a time point of an hour later from the current time, for example.

Next, the movement path decision section 104 decides a movement path of physical shops on the basis of the physical shop list (step S206).

Subsequently, the drive control section 105 moves the pet robot 1 to a physical shop in accordance with the decided movement path (step S209).

Next, the drive control section 105 moves the pet robot 1 into a shop, and the camera 15 captures an image of the inside of the shop (step S212). For example, the camera 15 captures an image of a commercial product exhibited in the shop.

Figure 14:
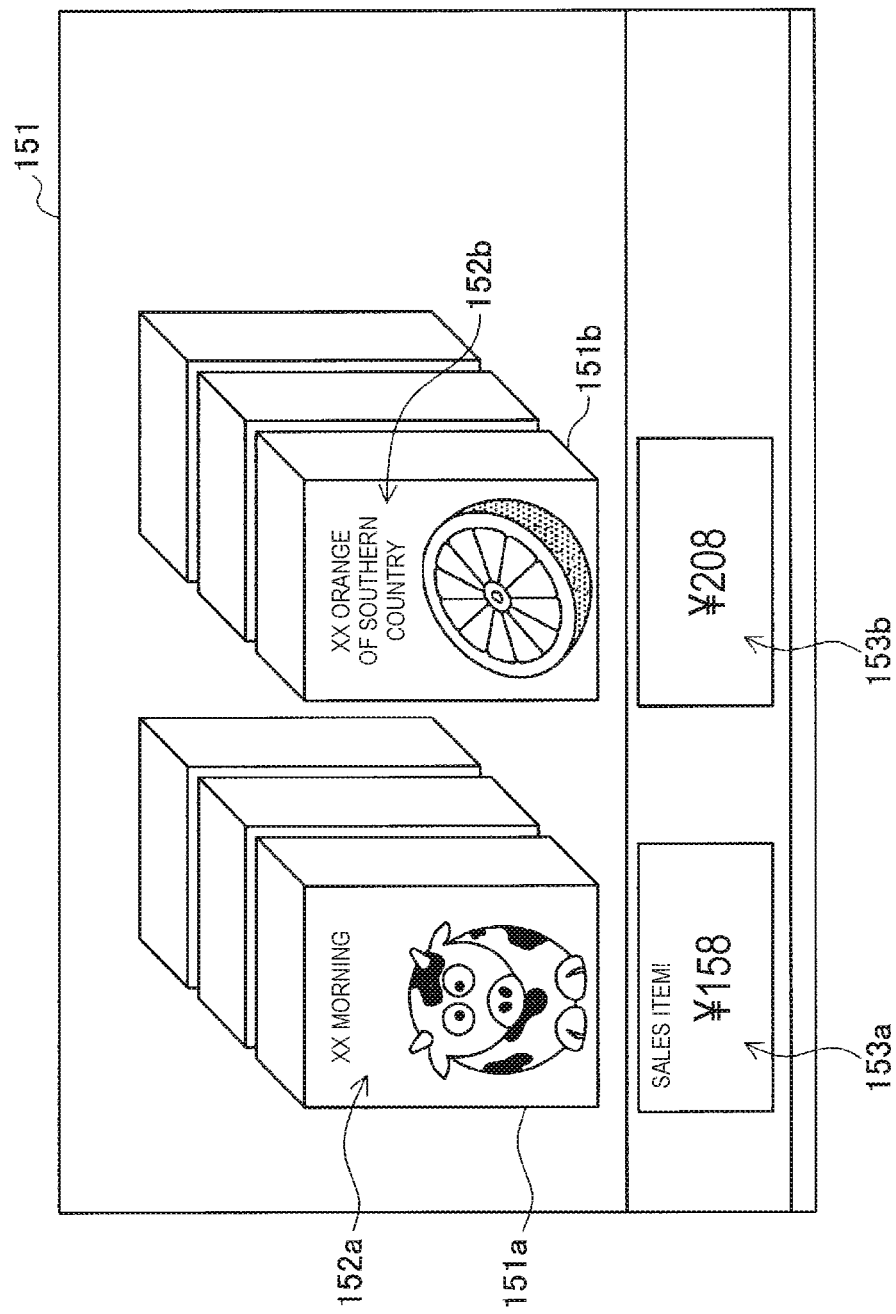
FIG. 14 is a diagram describing object recognition from a captured image of an inside of a shop according to the first embodiment of the present disclosure.

Subsequently, the object recognition section 111 performs object recognition from a captured image obtained by capturing the image of the inside of the shop (step S215). For example, as illustrated in FIG. 14, the object recognition section 111 recognizes objects 151a and 151b from a captured image 151 obtained by capturing an image of an exhibition rack in the shop.

Next, in a case where there is still an unprocessed item in the purchase master list (step S218/Yes), the object recognition section 111 also recognizes characters and numbers in a certain range around the above-described recognized object (step S221). For example, in a case where the object recognition section 111 recognizes the objects 151a and 151b from the captured image 151 as illustrated in FIG. 14, the object recognition section 111 further recognizes character strings 152a and 152b, and numbers (price tags) 153a and 153b.

Subsequently, the shop list generation section 102 determines whether or not content of a recognized character string, a recognized object, and an unprocessed item match (step S224). For example, in a case where processing is performed on "xx morning (milk)" as an unprocessed item, the shop list generation section 102 compares the objects 151a and 151b and the character strings 152a and 152b that have been recognized from the captured image 151 as illustrated in FIG. 14, with "xx morning (milk)". In this case, the object 151a and the character string 152a and "xx morning (milk)" match, and it is confirmed that the unprocessed item exists in the shop.

Next, in a case where these match (step S224/Yes), the shop list generation section 102 registers a recognized price of a corresponding item in a physical shop item list (step S227). The price of the item is acquired on the basis of the number 153a recognized from the captured image 151, for example. Normally, a price tag is placed on a commercial product itself or placed near the commercial product. Thus, on the basis of an object recognition result obtained from a captured image, the shop list generation section 102 regards a set of a number and a currency mark (¥, $, Yen, etc.) arranged near a character string or an object that indicates the name of a commercial product, as a price, and acquires the price of the commercial product.

Each time image capturing of the inside of the shop is performed, the shop list generation section 102 repeats the processing illustrated in steps S221 to S227 described above, for all the items included in the purchase master list (step S218).

Subsequently, when an unprocessed item becomes nonexistent in the purchase master list (step S218/No), in a case where the inside of the shop has not been entirely shot yet (step S230/No), the pet robot 1 moves to a location in the shop that has not been shot (step S233), and repeats processing subsequent to step S212 described above. Note that the pet robot 1 may perform the above-described object recognition by receiving a shot image of the inside of the shop from another pet robot 1, or may preferentially move to a location where there is a high possibility that an item included in the purchase master list is exhibited, with reference to a goods classification signboard in the shop.

On the other hand, in a case where the inside of the shop has been entirely shot (step S233/Yes), if the pet robot 1 has not moved to all the physical shops (step S236/No), the pet robot 1 moves to the next physical shop (step S209). Steps S209 to S230 described above are repeated until the pet robot 1 moves to all the physical shops included in the physical shop list (step S236).

In this manner, a physical shop item list is generated. Here, FIG. 15 illustrates an example of a physical shop item list. A physical shop item list 251 illustrated in FIG. 15 includes price information of each purchase item of each physical shop. An item not found in a physical shop is not registered in the physical shop item list. As illustrated in FIG. 15, it can be seen that the price of the same item (same master number) varies depending on the shop.

(Generation of Purchase Execution List)

Next, the generation of a purchase execution list performed by the shop list generation section 102 that is illustrated in step S112 described above will be specifically described with reference to FIGS. 16 to 18.

Figure 16:
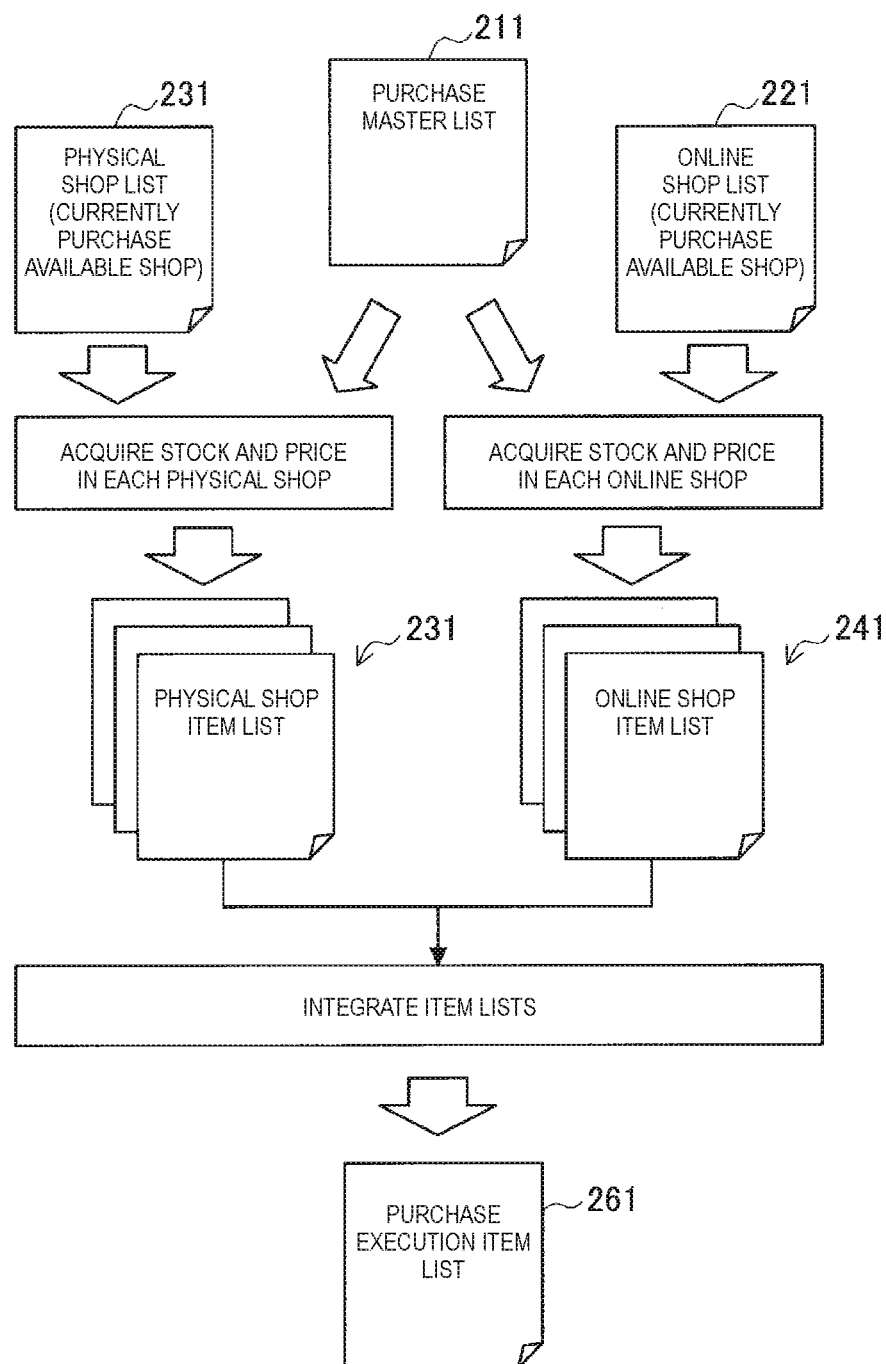
FIG. 16 is a diagram describing an overview of purchase execution list generation according to the first embodiment of the present disclosure.

FIG. 16 is a diagram describing an overview of purchase execution list generation according to the present embodiment. As illustrated in FIG. 16, on the basis of the purchase master list 211 and the physical shop list 231, the stock and price of each item in each physical shop are acquired, and the physical shop list 231 is generated. In addition, on the basis of the purchase master list 211 and the online shop list 221, the stock and price of each item in each online shop are acquired, and the online shop item list 241 is generated. Then, these item lists are integrated, and a purchase execution list 261 indicating an optimum shop for the purchase of each item is generated. The generation processing of the purchase execution list 261 will be specifically described with reference to FIG. 17.

Figure 17:
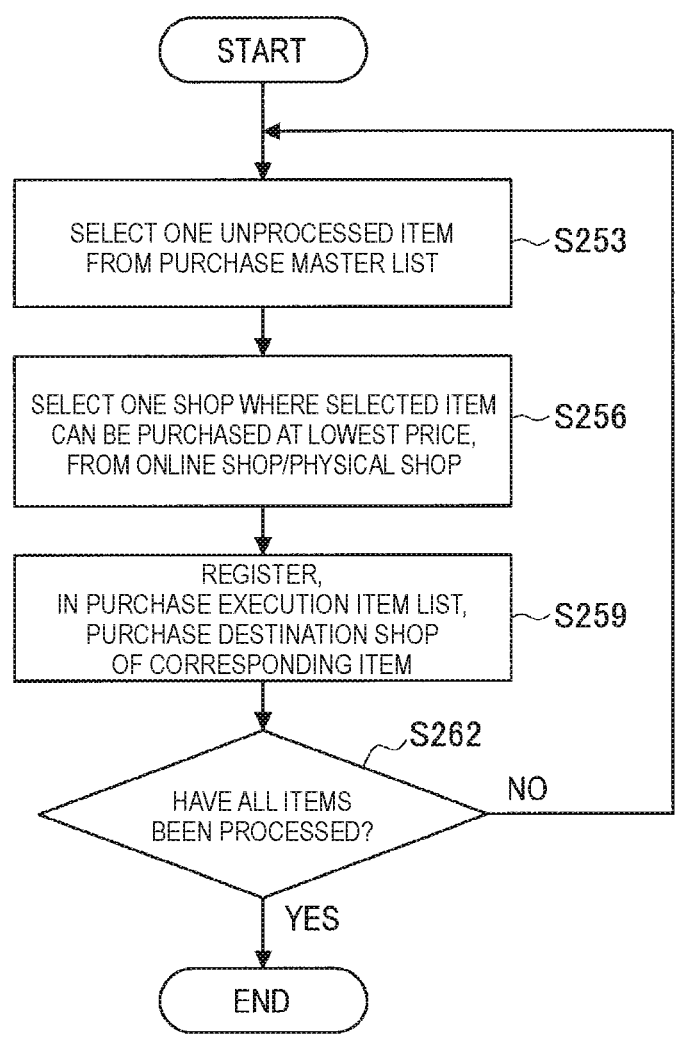
FIG. 17 is a flow chart illustrating generation processing of a purchase execution list according to the first embodiment of the present disclosure.

FIG. 17 is a flow chart illustrating generation processing of a purchase execution list according to the present embodiment. As illustrated in FIG. 17, first of all, the purchase execution list generation section 103 selects one unprocessed item from the purchase master list (step S253).

Next, the purchase execution list generation section 103 searches an online shop item list and a physical shop item list for a shop where the above-described selected item can be purchased at the lowest price (step S256). At this time, in a case where shipping cost is required, the shipping cost can be considered.

Subsequently, the purchase execution list generation section 103 registers, in the purchase execution list, a lowest price purchase destination shop (ID) of the corresponding item that has been retrieved (step S259).

Next, the processing illustrated in steps S253 to S259 described above is repeated for all items in the purchase master list (step S262).

In this manner, a purchase execution list is generated. Here, FIG. 18 illustrates an example of a purchase execution list. The purchase execution list 261 illustrated in FIG. 18 includes items of a master number, a corresponding optimum purchase shop (ID), and a purchase status (status). It becomes possible for the pet robot 1 to recommend an optimum shop of each item to the user, on the basis of the purchase execution list 261. In addition, when the purchase of an item has been completed, a state in a purchase status is changed to "purchase completion".

3-2. Second Embodiment

In the first embodiment described above, the user arbitrarily inputs a purchase master list, but the present disclosure is not limited to this, and the pet robot 1 can also automatically generate a purchase master list by learning an item necessary for the user. Hereinafter, an example of purchase master list automatic generation will be described with reference to FIGS. 19 to 23. Here, for example, a case where content (items) in a refrigerator, a shelf, or the like of the user in a home is always recognized, consumed goods and supplied goods (replenished good) are detected, a purchase timing is learned, and the user is promoted to purchase an item so as not to forget to purchase (recommendation of item) will be described. Note that, here, an increase and a decrease (replenishment history) of items in the refrigerator are automatically recognized and a purchase probability is calculated, but the present embodiment is not limited to the inside of the refrigerator, and a purchase probability may be calculated on the basis of a purchase history (or replenishment history) of general commercial products of the user.

Figure 19:
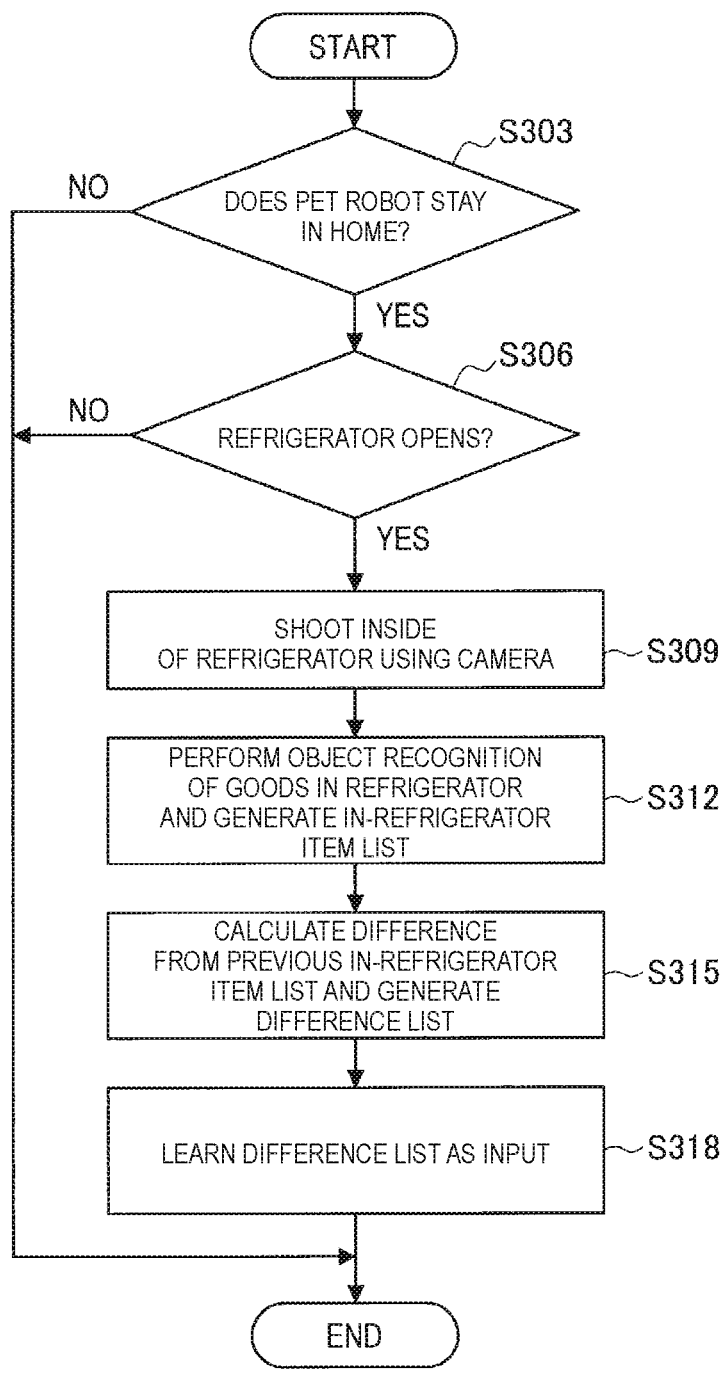
FIG. 19 is a flow chart illustrating in-refrigerator item learning processing according to a second embodiment of the present disclosure.

FIG. 19 is a flow chart illustrating in-refrigerator item learning processing according to the second embodiment. As illustrated in FIG. 19, first of all, it is determined whether or not the pet robot 1 is in a state of staying in the home (step S303). Because the pet robot 1 can perform an autonomous movement, a case where the pet robot 1 goes out following the user is also assumed. Thus, for example, the control section 10 of the pet robot 1 determines whether or not the pet robot 1 stays in the home of the user, on the basis of current position information acquired by the position information acquisition section 14.

Next, in a case where the pet robot 1 stays in the home (step S303/Yes), when a refrigerator opens (step S306/Yes), the pet robot 1 captures an image of the inside of the refrigerator using the camera 15 (step S309). For example, the pet robot 1 continuously performs monitoring of surrounding environmental sound using the voice input section 16, and monitoring of a surrounding situation using the camera 15, and when the user approaches the refrigerator, the pet robot 1 autonomously moves to the vicinity of the refrigerator following the user, and when the user opens the refrigerator, the pet robot 1 shoots the inside of the refrigerator using the camera 15. In addition, opening-closing of the refrigerator may be detected by an opening-closing sensor, and when notification is received, the pet robot 1 may move to the vicinity of the refrigerator and shoot the inside of the refrigerator using the camera 15. In addition, the pet robot 1 may receive a captured image of the inside of the refrigerator that has been shot by a camera installed in the refrigerator or near the refrigerator.

Subsequently, using the object recognition section 111, the control section 10 analyzes the captured image and recognizes goods in the refrigerator, and generates a current in-refrigerator item list (step S312).

Figure 21:
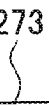
FIG. 21 is a diagram illustrating an example of a difference list according to the second embodiment of the present disclosure.

Next, the control section 10 compares the generated current in-refrigerator item list with a previous in-refrigerator item list, and generates a difference list (step S315). Here, FIG. 20 illustrates examples of the current in-refrigerator item list and the previous in-refrigerator item list. As illustrated in FIG. 20, in a current in-refrigerator item list 271, information regarding product names or articles of items currently stored in the refrigerator, and the number of the items is indicated. In addition, in a previous in-refrigerator item list 272, information regarding product names or articles of in-refrigerator items recognized by the pet robot 1 when the user has opened the refrigerator the last time, and the number of the items is indicated. The control section 10 compares these item lists and generates a difference list. Here, FIG. 21 illustrates an example of a difference list according to the present embodiment. In a difference list 273 illustrated in FIG. 21, difference information from the last time of each item is indicated. In the example illustrated in the drawing, it is indicated that "product name: XX morning", "article: tomato ketchup", and "article: carrot" each decrease by one, "article: egg" increases by six, "article: tofu" and "article: shortcake" each increase by one, and "product name: blessing of orange of XX" has no difference.

Subsequently, the control section 10 learns the difference list as an input (step S318). Specifically, the control section 10 stores the generated difference list and the current in-refrigerator item list into the storage section 20 together with current time and date.

By repeatedly performing the learning processing described above, the control section 10 can output a purchase cycle probability of each item. In addition, by also learning event days such as birthdays and Christmas, it becomes possible to obtain a purchase probability associated with an event. On the basis of the learned difference list, the control section 10 regards a day on which in-refrigerator items increase, as a purchase day (or identifies a purchase day on the basis of the purchase execution list), calculates a timing (replenishment day) at which each item is to be purchased, and a purchase cycle is predicted. Here, FIG. 22 illustrates an example of a purchase cycle probability list according to the present embodiment. As illustrated in FIG. 22, in a purchase cycle probability list 274, a purchase cycle prediction probability of each item is indicated. In the example illustrated in the drawing, for example, it can be seen that a purchase probability in one day of the "product name: XX morning" is 0.13%, a purchase probability in two days is 0.58%, and a purchase probability in three days is 0.22%.

Figure 23:
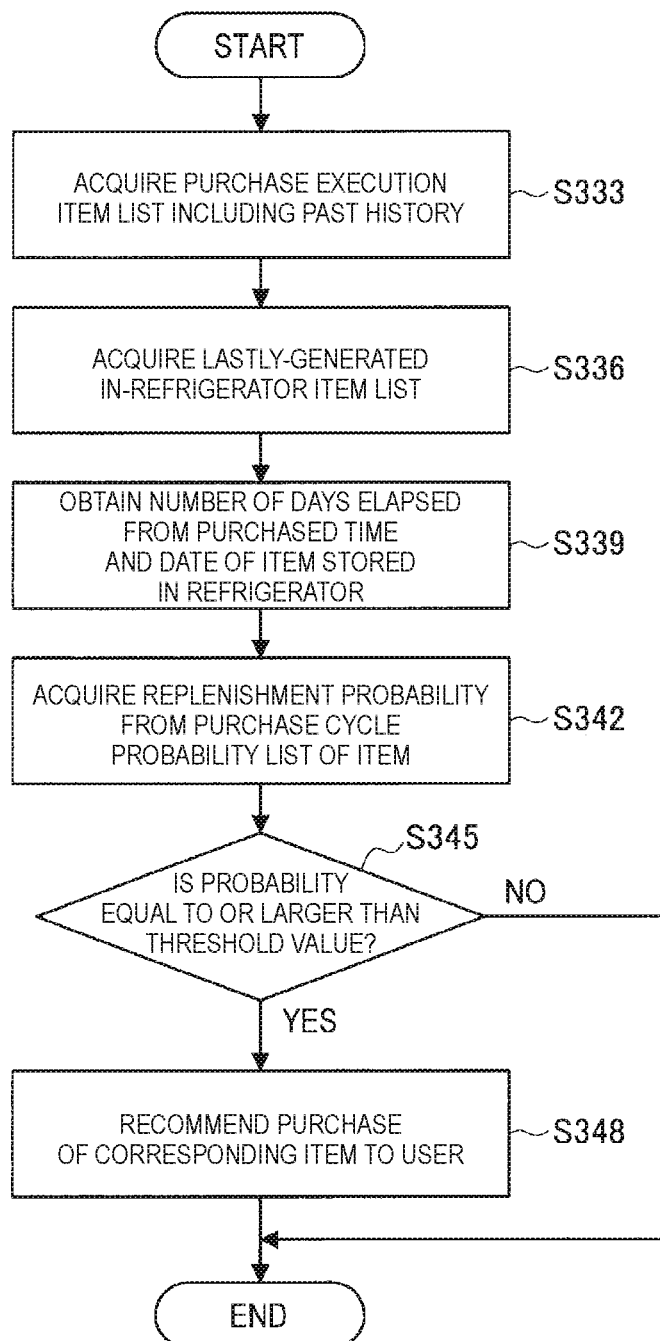
FIG. 23 is a flow chart illustrating recommendation processing of a purchase item according to the second embodiment of the present disclosure.

Subsequently, the case of performing recommendation of a purchase item that is based on the above-described learning will be described with reference to FIG. 23. FIG. 23 is a flow chart illustrating recommendation processing of a purchase item according to the present embodiment. The recommendation processing illustrated in FIG. 23 may be periodically performed, may be performed when a purchase master list is acquired, or may be performed when the user opens the refrigerator, and an in-refrigerator item list is updated by the pet robot 1.

As illustrated in FIG. 23, first of all, the control section 10 acquires, from the purchase execution list DB 260, a purchase execution list including a past history (step S333). A limit value of a past history to be acquired may be set to about one month to one year, for example.

Next, the control section 10 acquires a lastly-generated in-refrigerator item list from the storage section 20 (step S336).

Subsequently, the control section 10 obtains the number of days elapsed from purchased time and date of an item stored in the refrigerator (step S339). Specifically, the control section 10 retroactively searches a recent history of a purchase execution list for each item included in the in-refrigerator item list, and identifies a purchase day. By comparing the purchase day and current date, the control section 10 recognizes how many days elapsed from when a corresponding item has been purchased.

Subsequently, the control section 10 acquires a purchase probability from the purchase cycle probability list (step S342). Specifically, the control section 10 acquires, from the purchase cycle probability list 274 as illustrated in FIG. 22, a purchase probability in the number of days elapsed after purchase of each item.

Next, in a case where a purchase probability is equal to or larger than a threshold value (first threshold value) (step S345/Yes), the control section 10 recommends purchase of a corresponding item to the user (step S348). In a case where a purchase probability is equal to or larger than a threshold value, because there is a high possibility that an item is to be purchased (replenished) soon, from the viewpoint of a purchase cycle, the pet robot 1 promotes the purchase of the item by voice or display. Specifically, for example, on a creation screen of a purchase master list that is used by the user, the control section 10 presents, as purchase recommendation items, items having purchase probabilities that are equal to or larger than the threshold value, and automatically adds the items to the purchase master list. In a case where a recommendation item is unnecessary, the user issues a deletion instruction of the item on the creation screen of a purchase master list.

3-3. Third Embodiment

In the above-described second embodiment, processing of recommending a purchase item on the basis of learning has been described, but if the accuracy of the learning increases, not only recommendation is performed, but also a purchase master list can be generated on the basis of a learning result, and purchase can be automatically performed. Hereinafter, specific description will be given with reference to FIG. 24.

Figure 24:
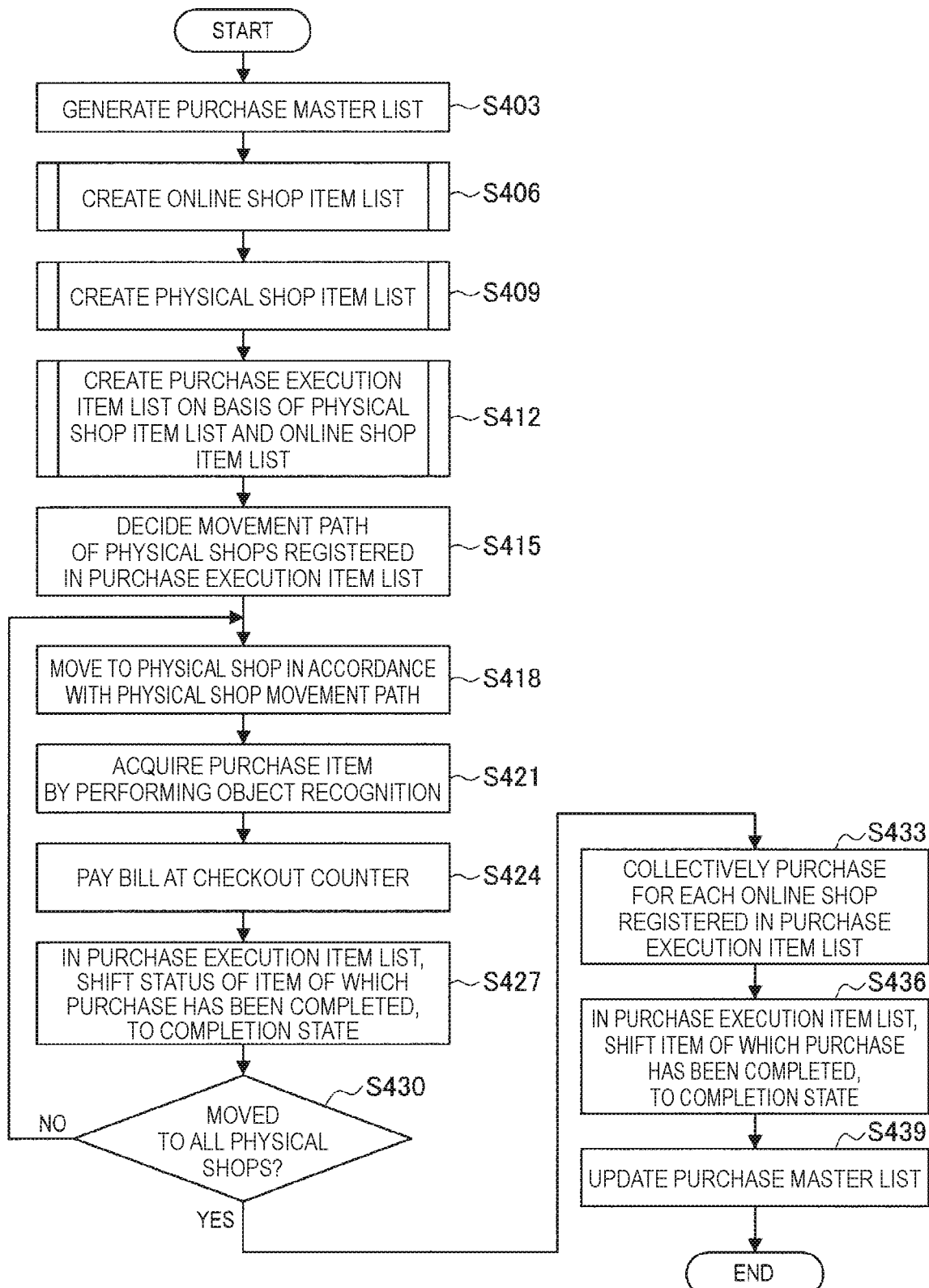
FIG. 24 is a flow chart illustrating operation processing according to a third embodiment of the present disclosure.

FIG. 24 is a flow chart illustrating operation processing according to the third embodiment. As illustrated in FIG. 24, first of all, the purchase master list acquisition section 101 of the pet robot 1 automatically generates a purchase master list (step S403). Specifically, the purchase master list acquisition section 101 automatically generates a purchase master list by including, in the purchase master list, items having purchase probabilities that are equal to or larger than a threshold value, on the basis of a learning result indicated in the second embodiment. For example, the purchase master list acquisition section 101 automatically generates a purchase master list by including, in the purchase master list, items having higher purchase probabilities, using a second threshold value higher than the first threshold value used in step S345 of FIG. 23.

Next, in steps S406 to S415, processing similar to steps S106 to S115 described in FIG. 9 is performed. In other words, the control section 10 generates an online shop item list and a physical shop item list, and on the basis of these, generates a purchase execution list that decides which item is to be finally purchased from which shop (steps S406 to S412). Subsequently, the control section 10 decides a movement path of physical shops registered in the purchase execution list, using the movement path decision section 104 (step S415).

Subsequently, the pet robot 1 autonomously moves to a physical shop in accordance with the decided movement path (step S418), and acquires a purchase item by performing object recognition in the physical shop (step S421). Specifically, for example, the pet robot 1 informs a shop staff of a purchase item by voice or display, and asks the shop staff to put the purchase item into a shopping basket or cart. In addition, the pet robot 1 including a structure for seizing an object seizes a purchase item on the basis of an object recognition result and puts the purchase item into a basket or a cart. As described above, for example, in the case of a bipedal walking humanoid agent robot, an operation of seizing a commercial product and putting the commercial product into a shopping cart using an arm and fingers of an upper half of the body is also enabled.

Next, the pet robot 1 moves to a checkout counter and pays a bill of the purchase item (step S424). For example, paying processing is manually performed by a shop staff, or automatically performed.

Subsequently, in the purchase execution list, the purchase execution list generation section 103 shifts a status of an item of which purchase has been completed, to the "purchase completion" state (step S427).

Steps S418 to S427 described above are repeated until the pet robot 1 moves to all the physical shops registered in the purchase execution list (step S430).

Next, the online purchase processing section 110 performs processing of collectively purchasing items left in the purchase execution list, for each online shop (step S433).

Subsequently, in the purchase execution list, the purchase execution list generation section 103 shifts a status of an item of which purchase has been completed, to the "purchase completion" state (step S436).

Then, the control section 10 of the pet robot 1 updates the purchase master list in accordance with a change in status of the purchase execution list (step S439). For example, the control section 10 deletes an item of which purchase has been completed, from the purchase master list.

As described above, according to the third embodiment, it becomes possible for the pet robot 1 to automatically perform all the processing from the decision of a purchase item to purchase.

3-4. Fourth Embodiment

The above-described third embodiment uses a completely-automatic mode, but the present disclosure is not limited to this, and in a case where a situation different from usual, such as a change in body temperature of the user, is caused (e.g. a case where the user is tired, a case where the user feels bad, etc.), the mode may be shifted to a recommendation mode, and automatic purchase may be executed as necessary. Hereinafter, specific description will be given with reference to FIG. 25.

Figure 25:
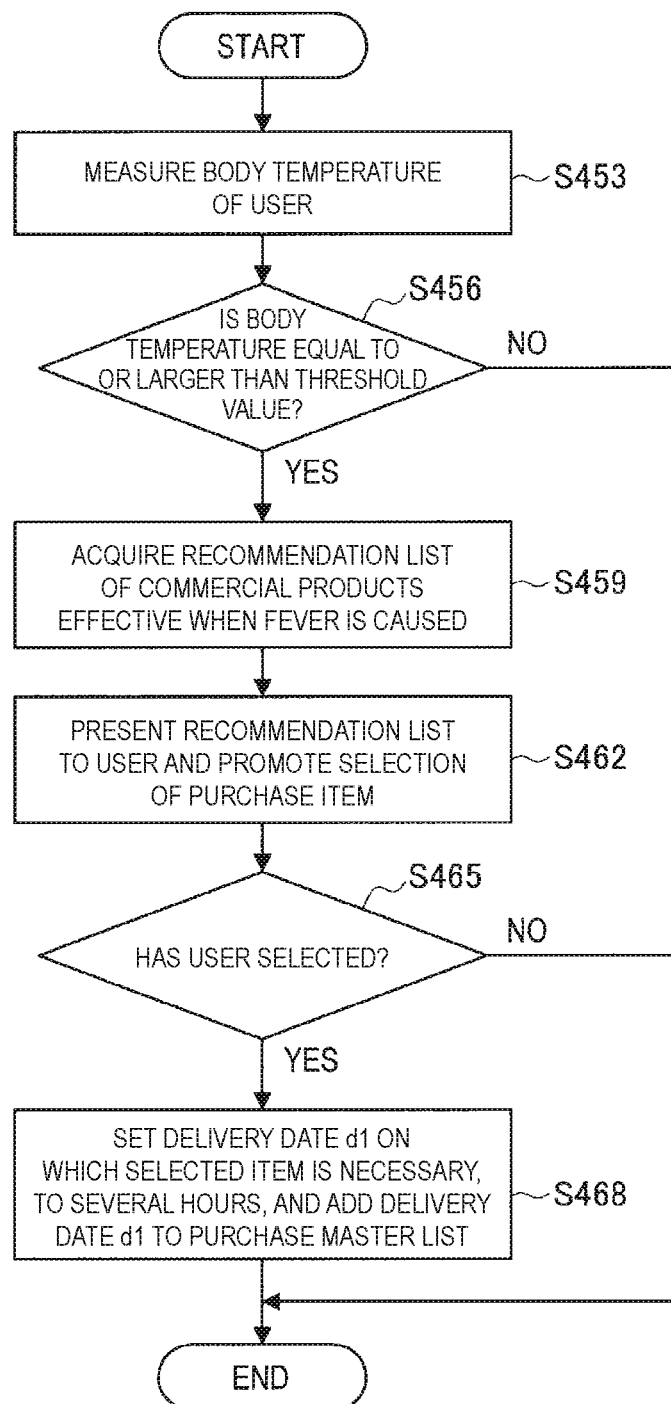
FIG. 25 is a flow chart illustrating operation processing according to a fourth embodiment of the present disclosure.

FIG. 25 is a flow chart illustrating operation processing according to the fourth embodiment. As illustrated in FIG. 25, first of all, the pet robot 1 measures body temperature of the user (step S453). For example, the pet robot 1 detects the body temperature of the user using a thermal sensor or a thermography. In a case where the pet robot 1 is provided with these sensors, the pet robot 1 can detect the body temperature of the user when the user touches the pet robot 1.

Next, in a case where the body temperature is equal to or larger than a threshold value (e.g. 37.0 degrees Celsius) (step S456/Yes), the control section 10 acquires a recommendation list of items effective when fever is caused (step S459). The recommendation list may be prestored in the storage section 20, or may be acquired from a predetermined server on a network. The recommendation list includes commercial products necessary when fever is caused. In addition, the control section 10 may ask predetermined artificial intelligence about "what is a commercial product necessary when fever is caused" or the like, and use the result as a recommendation list. In addition, a determination criterion of the control section 10 is not limited to a determination criterion as to whether or not the body temperature is equal to or larger than a threshold value, and for example, whether or not the body temperature of the user is larger than a measurement average value by a predetermined temperature or more may be used as a determination criterion.

Subsequently, the control section 10 presents the recommendation list to the user from the display section 21, for example, and promotes the selection of a purchase item (step S462).

Next, in a case where the user has performed selection (step S465/Yes), the control section 10 sets a delivery date d1 on which a commercial product selected by the user is necessary, to several hours, for example, and adds the delivery date d1 to a purchase master list (step S468).

In this manner, the control section 10 can generate a purchase master list considering the selection of the user. Then, after a purchase master list is generated, similarly to the operation processing illustrated in FIG. 24, it becomes possible for the pet robot 1 to automatically purchase an item in a physical shop or an online shop, and deliver a necessary item to the user feeling bad. Note that, in the example described above, "body temperature" is detected as an example of determining a change in situation of the user, but the present embodiment is not limited to this, and for example, a change from usual in user situation may be determined by detecting heartbeat, an amount of perspiration, brain waves, an amount of activity, or the like of the user. For example, on the basis of acceleration sensor information detected by an acceleration sensor provided on the user, the pet robot 1 can detect a motion of the user, compare the detected motion with a usual amount of activity, and determine a change from usual in user situation such as whether or not the user is tired or whether or not the user feels bad.

4. SUPPLEMENT

In the embodiments described above, the pet robot 1 independently performs recommendation of a purchase shop of an item, generation of a purchase master list, and automatic purchase, but the present embodiment is not limited to this, and the above-described processing can also be executed on the server 3 side, and the pet robot 1 can be controlled by the server 3.

As illustrated in FIG. 2, for example, the pet robot 1 can connect to the network 2 in a wired/wireless manner, and perform data communication with the server 3 on the network. The pet robot 1 transmits collected user speech voice, a captured image that has been captured, current position information, and the like to the server 3, and recommendation of a purchase shop of an item, generation of a purchase master list, and automatic purchase control can be performed by the server 3. In accordance with the control of the server 3, the pet robot 1 can perform information presentation to the user and a movement to a physical shop. For example, the pet robot 1 receives a purchase execution list from the server 3, and on the basis of the purchase execution list, outputs, to the user, by voice or display, information for recommending purchase in a physical shop for partial commercial products, and recommending purchase in an online shop for the other commercial products.

Figure 26:
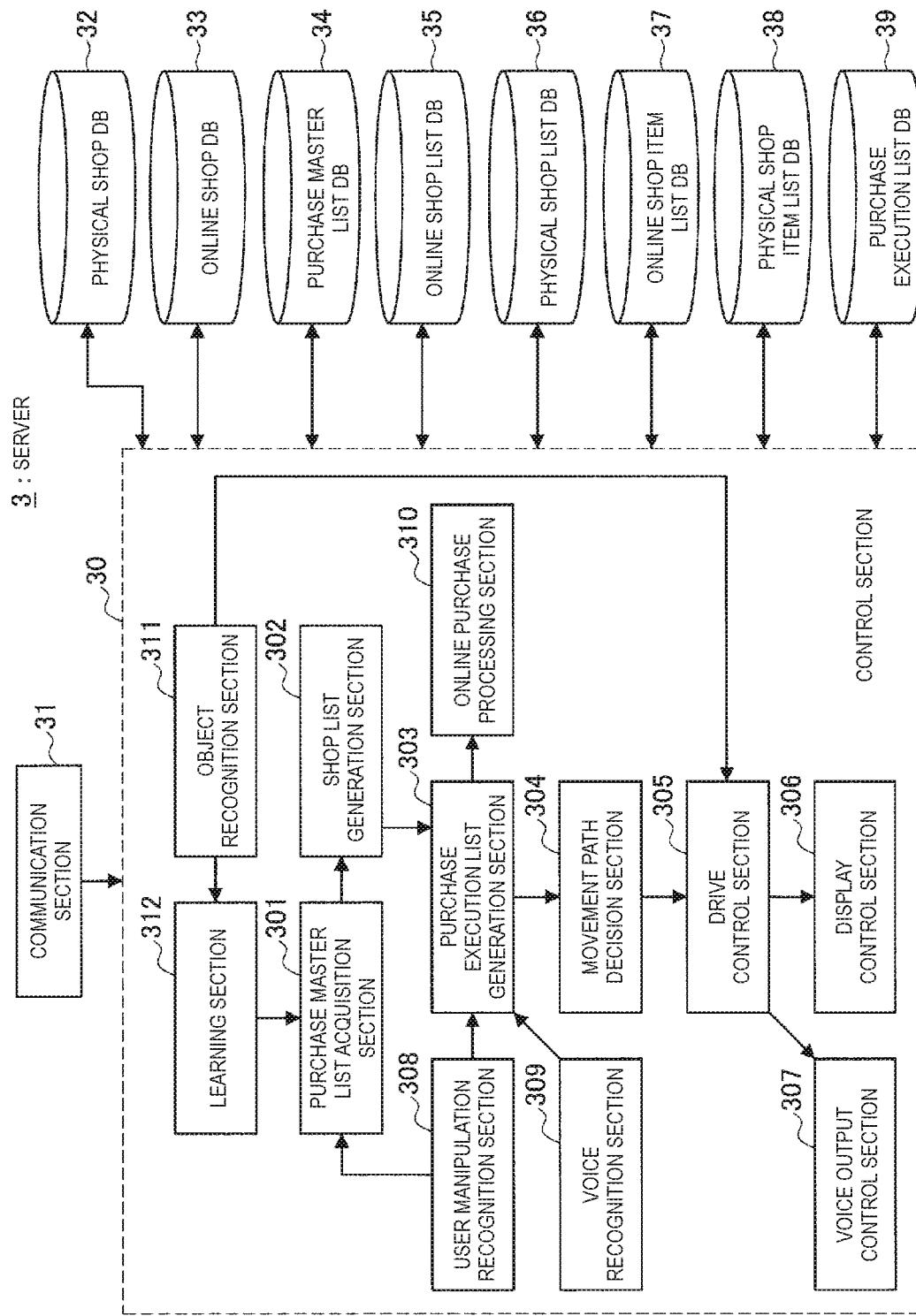
FIG. 26 is a block diagram illustrating an example of a configuration of a server according to an embodiment of the present disclosure.

Here, a configuration example of the server 3 will be specifically described with reference to FIG. 26. FIG. 26 is a block diagram illustrating an example of a configuration of the server 3 according to the present embodiment. As illustrated in FIG. 26, the server 3 includes a control section 30, a communication section 31, the physical shop DB 32, the online shop DB 33, a purchase master list DB 34, an online shop list DB 35, a physical shop list DB 36, an online shop item list DB 37, a physical shop item list DB 38, and a purchase execution list DB 39.

The communication section 31 is a communication module for performing transmission and reception of data with another device. For example, the communication section 31 connects with the pet robot 1 via the network 2, and performs transmission and reception of data.

The control section 30 functions as an arithmetic processing unit and a control device, and controls the entire operations performed inside the server 3, in accordance with various types of programs. The control section 30 is implemented by an electronic circuit such as a CPU or a microprocessor, for example. In addition, the control section 30 may include a ROM that stores programs, calculation parameters, and the like that are to be used, and a RAM that temporarily stores appropriately varying parameters and the like.

In addition, the control section 30 according to the present embodiment functions as a purchase master list acquisition section 301, a shop list generation section 302, a purchase execution list generation section 303, a movement path decision section 304, a drive control section 305, a display control section 306, a voice output control section 307, a user manipulation recognition section 308, a voice recognition section 309, an online purchase processing section 310, an object recognition section 311, and a learning section 312. Note that the functions of the respective constituent elements are similar to corresponding configurations of the control section 10 of the pet robot 1 that have been described with reference to FIG. 4.

In this manner, the information processing system according to the present embodiment may employ a configuration in which the server 3 performs main processing. Note that the configuration of the server 3 is not limited to the example illustrated in FIG. 26, and a configuration in which a part of the functions of the control section 10 of the pet robot 1 is performed by the server 3 may be employed.

5. CONCLUSION

As described above, in an information processing system according to an embodiment of the present disclosure, optimum shopping in a physical shop and an online shop can be supported.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, computer programs for executing the functions of the pet robot 1 or the server 3 can be created in pieces of hardware such as a CPU, a ROM, and a RAM that are built in the pet robot 1 or the server 3 of the above-described information processing system. In addition, a computer readable storage medium storing the computer programs is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An agent robot control system including:
an acquisition section configured to acquire a purchase master list indicating a candidate of a purchase commercial product of a user; and
a control section configured to generate a purchase execution list for recommending purchase in a physical shop for a partial commercial product of the purchase master list, and recommending purchase in an online shop for another commercial product.

(2)
The agent robot control system according to (1), in which the control section
compares a price in an online shop and a price in a physical shop of each commercial product in the purchase master list, and
generates, on the basis of a comparison result, a purchase execution list for recommending purchase in a physical shop for a partial commercial product of the purchase master list, and recommending purchase in an online shop for another commercial product.

(3)
The agent robot control system according to (2), in which the physical shop is a physical shop located within a predetermined range from a home of a user.

(4)
The agent robot control system according to (1) to (3), in which the control section generates, on the basis of the purchase execution list, a movement path from a current position of an agent robot to a physical shop in the purchase execution list.

(5)
The agent robot control system according to (4), in which, when the control section detects a commercial product of which purchase has been completed in the physical shop, via the agent robot that has moved to the physical shop on the basis of the movement path,
the control section performs control so as to perform a purchase procedure in the online shop of a commercial product in the purchase master list that is other than the commercial product of which purchase has been completed.

(6)
The agent robot control system according to (4) or (5), in which, upon arrival at the physical shop, the control section performs control so as to present, by display or voice, a commercial product in the purchase master list that is recommended to be purchased in the physical shop.

(7)
The agent robot control system according to any one of (4) to (6), in which the agent robot control system is an agent robot,
a drive section configured to cause the agent robot to autonomously move is included, and
the control section moves the agent robot to a physical shop by controlling the drive section on the basis of the movement path.

(8)
The agent robot control system according to (7), in which, when a probability of purchasing a commercial product is estimated to be equal to or larger than a first value, the control section of the agent robot recommends the user to purchase the commercial product, and automatically adds the commercial product to the purchase master list as a purchase commercial product candidate.

(9)
The agent robot control system according to (7), in which, when a probability of purchasing a commercial product is estimated to be equal to or larger than a second value larger than a first value, the control section generates a control signal for controlling the agent robot to automatically purchase the commercial product.

(10)

The agent robot control system according to (8) or (9), in which a purchase probability of the commercial product is calculated on the basis of a replenishment history of a commercial product.

(11)

The agent robot control system according to any one of (1) to (7), in which, when the control section recognizes that a state of a user that has been detected via an agent robot has an abnormality, the control section acquires a purchase recommendation list corresponding to the abnormality, and presents the purchase recommendation list to a user via the agent robot, and generates a control signal for adding a commercial product selected by the user from among the purchase recommendation list, to a purchase master list.

(12)

An agent robot system including:

a server including a first communication section configured to acquire a purchase master list indicating a candidate of a purchase commercial product of a user, and a first control section configured to generate a purchase execution list for recommending purchase in a physical shop for a partial commercial product of the purchase master list, and recommending purchase in an online shop for another commercial product, and perform control so as to transmit the purchase execution list to an agent robot via the first communication section; and an agent robot including a second communication section configured to receive the purchase execution list, an output section configured to output information to a user, and a control section configured to control the output section to output, to the user, information recommending purchase in a physical shop for the partial commercial product, and recommending purchase in an online shop for the other commercial product, on the basis of the purchase execution list.

(13)

An agent robot control method including:

by a processor, acquiring a purchase master list indicating a candidate of a purchase commercial product of a user; and generating a purchase execution list for recommending purchase in a physical shop for a partial commercial product of the purchase master list, and recommending purchase in an online shop for another commercial product.

(14)

A storage medium having an agent robot control program stored thereon, the agent robot control program causing a computer to function as:

an acquisition section configured to acquire a purchase master list indicating a candidate of a purchase commercial product of a user; and a control section configured to generate a purchase execution list for recommending purchase in a physical shop for a partial commercial product of the purchase master list, and recommending purchase in an online shop for another commercial product.

REFERENCE SIGNS LIST 1 pet robot
2 network
3 server
4 (4A to 4D) physical shop
5 online shop
6 trolley
10 control section
11 communication section
14 position information acquisition section
15 camera
16 voice input section
17 biosensor
18 drive section
19 touch sensor
20 storage section
21 display section
22 voice output section
23 acceleration sensor
24 angular velocity sensor
30 control section
31 communication section
32 physical shop DB
33 online shop DB
34 purchase master list DB
35 online shop list DB
36 physical shop list DB
37 online shop item list DB
38 physical shop item list DB
39 purchase execution list DB
101 purchase master list acquisition section
102 shop list generation section
103 purchase execution list generation section
104 movement path decision section
105 drive control section
106 display control section
107 voice output control section
108 user manipulation recognition section
109 voice recognition section
110 online purchase processing section
111 object recognition section
112 learning section
200 body portion unit
201 leg portion unit
202 head portion unit
203 tail portion unit
210 purchase master list DB
211 purchase master list
220 online shop list DB
221 online shop list
230 physical shop list DB
231 physical shop list
240 online shop item list DB
241 online shop item list
250 physical shop item list DB
251 physical shop item list
260 purchase execution list DB
261 purchase execution list
271 current in-refrigerator item list
272 previous in-refrigerator item list
273 difference list
274 purchase cycle probability list
301 purchase master list acquisition section
302 shop list generation section
303 purchase execution list generation section
304 movement path decision section
305 drive control section
306 display control section
307 voice output control section
308 user manipulation recognition section 309 voice recognition section
310 online purchase processing section
311 object recognition section
312 learning section

The invention claimed is:
1. An agent robot control system, comprising:
an acquisition section configured to acquire a purchase master list that indicates a first plurality of commercial products, wherein
the first plurality of commercial products corresponds to purchase candidate items of a user, and
the first plurality of commercial products includes a first partial set of the first plurality of commercial products and a second partial set of the first plurality of commercial products different from the first partial set of the first plurality of commercial products; and
a control section configured to:
generate a purchase execution list to recommend:
purchase, in a physical shop, for the first partial set of the first plurality of commercial products of the purchase master list, and
purchase, in an online shop, for the second partial set of the first plurality of commercial products of the purchase master list;
generate, based on the generated purchase execution list, a movement path from a current position of an agent robot to the physical shop, wherein the agent robot is associated with the agent robot control system;
detect the first partial set of the first plurality of commercial products of which purchase has been completed in the physical shop via the agent robot that has moved to the physical shop, wherein the movement of the agent robot to the physical shop is based on the movement path; and
control, based on the detection of the first partial set of the first plurality of commercial products, a purchase procedure in the online shop of the second partial set of the first plurality of commercial products.
2. The agent robot control system according to claim 1, wherein the control section is further configured to:
compare a price in the online shop and a price in the physical shop of each of the first plurality of commercial products, and
generate, based on a comparison result of the comparison, the purchase execution list to recommend:
purchase, in the physical shop, for the first partial set of the first plurality of commercial products of the purchase master list, and
purchase, in the online shop, for the second partial set of the first plurality of commercial products of the purchase master list.
3. The agent robot control system according to claim 2, wherein the physical shop is a shop located within a specific range from a home of the user.
4. The agent robot control system according to claim 1, wherein upon arrival of the agent robot at the physical shop, the control section is further configured to present, by one of display or voice, the first partial set of the first plurality of commercial products.
5. The agent robot control system according to claim 1, wherein
the agent robot control system is the agent robot,
the agent robot further includes a drive section configured to control the agent robot to autonomously move, and
the control section is further configured to control, based on the movement path, the drive section to move the agent robot to the physical shop.
6. The agent robot control system according to claim 5, wherein, based on a probability of purchasing each of a second plurality of commercial products being equal to or larger than a value, the control section is further configured to:
control the agent robot to recommend the user to purchase the second plurality of commercial products, and
automatically add the second plurality of commercial products to the purchase master list as the purchase candidate items.
7. The agent robot control system according to claim 6, wherein the probability of purchasing each of the second plurality of commercial products is calculated based on a replenishment history of each of the second plurality of commercial products.
8. The agent robot control system according to claim 5, wherein, based on a probability of purchasing each of a second plurality of commercial products being equal to or larger than a second value that is larger than a first value, the control section is further configured to generate a control signal to control the agent robot to automatically purchase the second plurality of commercial products.
9. The agent robot control system according to claim 1, wherein
the control section is further configured to recognize that a state of the user has an abnormality,
the state of the user is detected by the agent robot,
based on the recognition, the control section is further configured to:
acquire a purchase recommendation list that corresponds to the abnormality of the user,
present the purchase recommendation list to the user via the agent robot, and
generate a control signal to add a commercial product selected by the user from among the purchase recommendation list, and
the commercial product selected from the purchase recommendation list is added to the purchase master list.
10. An agent robot system, comprising:
an agent robot and a server that includes:
a first communication section configured to acquire a purchase master list that indicates a plurality of commercial products, wherein
the plurality of commercial products corresponds to purchase candidate items of a user, and
the plurality of commercial products includes a first partial set of the plurality of commercial products and a second partial set of the plurality of commercial products different from the first partial set of the plurality of commercial products, and
a first control section configured to:
generate a purchase execution list to recommend:
purchase, in a physical shop, for the first partial set of the plurality of commercial products of the purchase master list, and
purchase, in an online shop, for the second partial set of the plurality of commercial products of the purchase master list, wherein the first communication section is further configured to transmit the purchase execution list to the agent robot,
wherein the agent robot includes:
a second communication section configured to receive the purchase execution list, an output section configured to output information to a user, and a control section configured to:

control the output section to output the information that recommends:

purchase, in the physical shop, for the first partial set of the plurality of commercial products, and purchase, in the online shop, for the second partial set of the plurality of commercial products;

generate, based on the received purchase execution list, a movement path from a current position of the agent robot to the physical shop;

detect the first partial set of the plurality of commercial products of which purchase has been completed in the physical shop via the agent robot that has moved to the physical shop, wherein the movement of the agent robot to the physical shop is based on the movement path; and control, based on the detection of the first partial set of the plurality of commercial products, a purchase procedure in the online shop of the second partial set of the plurality of commercial products.

11. An agent robot control method, comprising:

by a processor of an agent robot control system:

acquiring a purchase master list that indicates a plurality of commercial products, wherein the plurality of commercial products corresponds to purchase candidate items of a user, and the plurality of commercial products includes a first partial set of the plurality of commercial products and a second partial set of the plurality of commercial products different from the first partial set of the plurality of commercial products; and generating a purchase execution list to recommend:

purchase, in a physical shop, for the first partial set of the plurality of commercial products of the purchase master list, and purchase, in an online shop, for the second partial set of the plurality of commercial products of the purchase master list;

generating, based on the generated purchase execution list, a movement path from a current position of an agent robot to the physical shop, wherein the agent robot is associated with the agent robot control system;

detecting the first partial set of the plurality of commercial products of which purchase has been completed in the physical shop via the agent robot that has moved to the physical shop, wherein the movement of the agent robot to the physical shop is based the movement path; and controlling, based on the detection of the first partial set of the plurality of commercial products, a purchase procedure in the online shop of the second partial set of the plurality of commercial products.

12. A non-transitory computer-readable medium, having stored thereon computer-executable instructions that, when executed by a processor, cause a computer to execute an operation, the operation comprising:

acquiring a purchase master list that indicates a plurality of commercial products, wherein the plurality of commercial products corresponds to purchase candidate items of a user, and the plurality of commercial products includes a first partial set of the plurality of commercial products and a second partial set of the plurality of commercial products different from the first partial set of the plurality of commercial products;

generating a purchase execution list to recommend:

purchase, in a physical shop, for the first partial set of the plurality of commercial products of the purchase master list, and purchase, in an online shop, for the second partial set of the plurality of commercial products of the purchase master list;

generating, based on the generated purchase execution list, a movement path from a current position of an agent robot to the physical shop;

detecting the first partial set of the plurality of commercial products of which purchase has been completed in the physical shop via the agent robot that has moved to the physical shop, wherein the movement of the agent robot to the physical shop is based on the movement path; and controlling, based on the detection of the first partial set of the plurality of commercial products, a purchase procedure in the online shop of the second partial set of the plurality of commercial products.

* * * * *